July 14, 1942.  L. E. GODFRIAUX  2,289,957
MACHINE TOOL TRANSMISSION AND CONTROL
Filed July 17, 1939  13 Sheets-Sheet 1
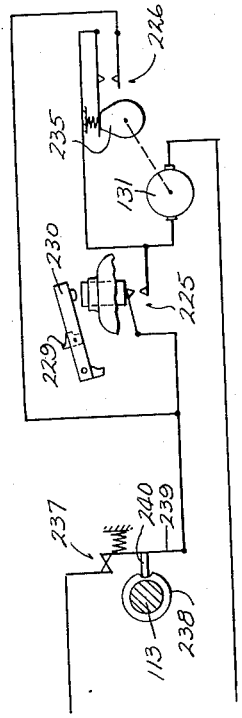
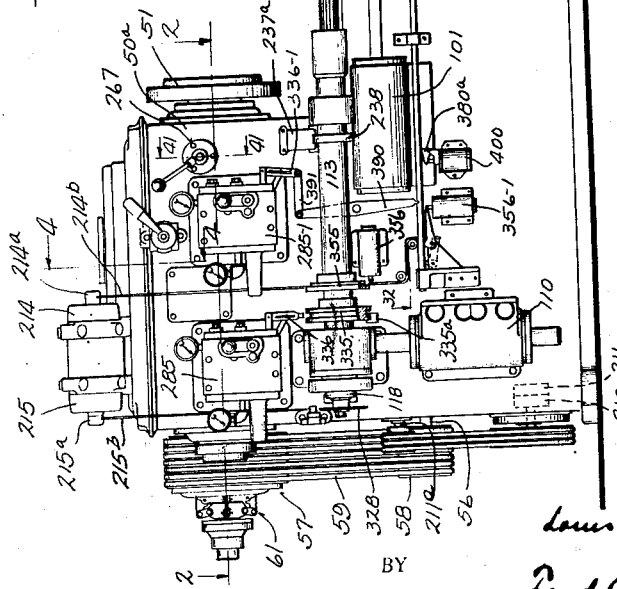
Fig. 49.
Fig. 1.
INVENTOR.
Louis Edward Godfriaux
BY
Fred G. Parsons
ATTORNEY.

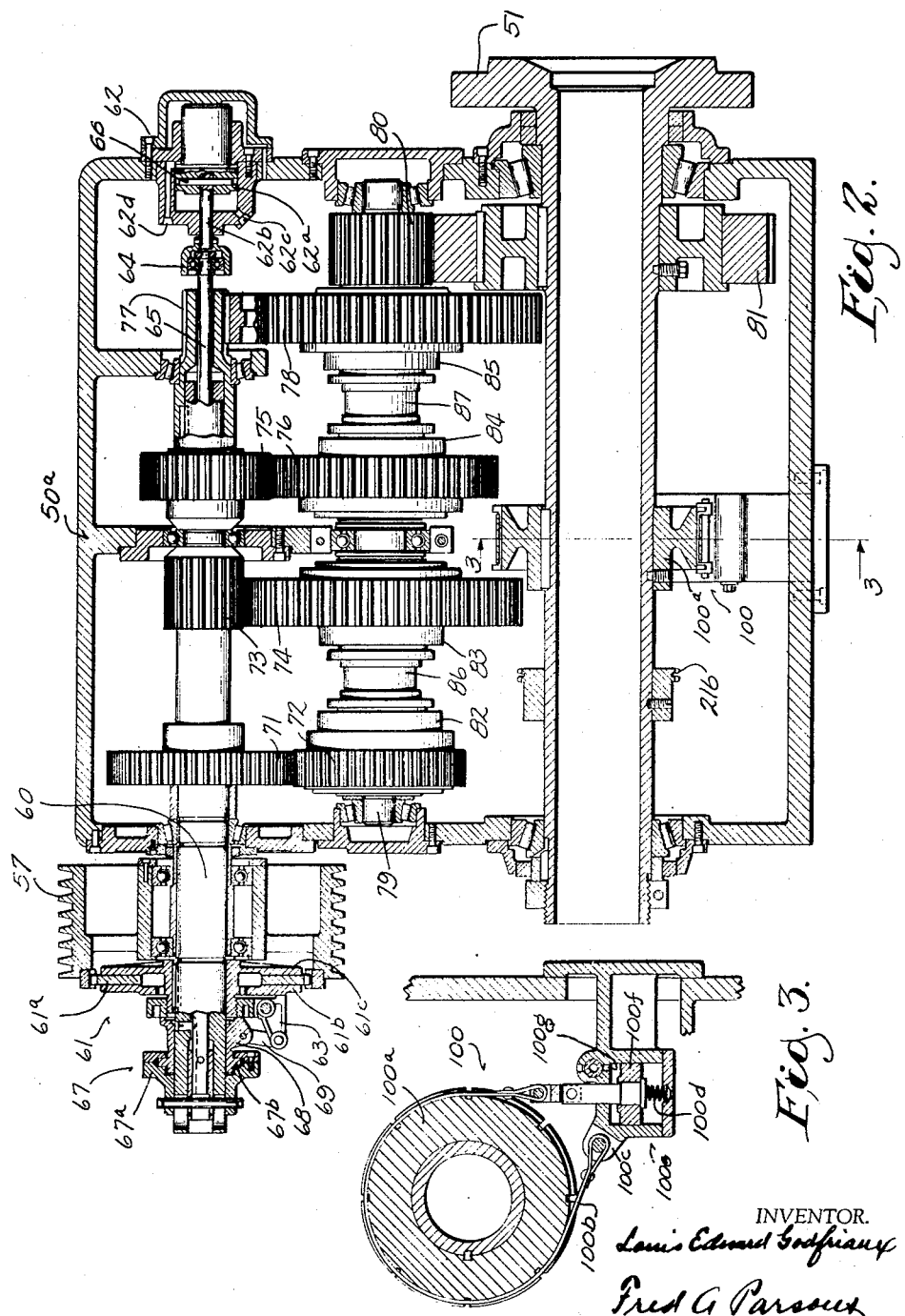

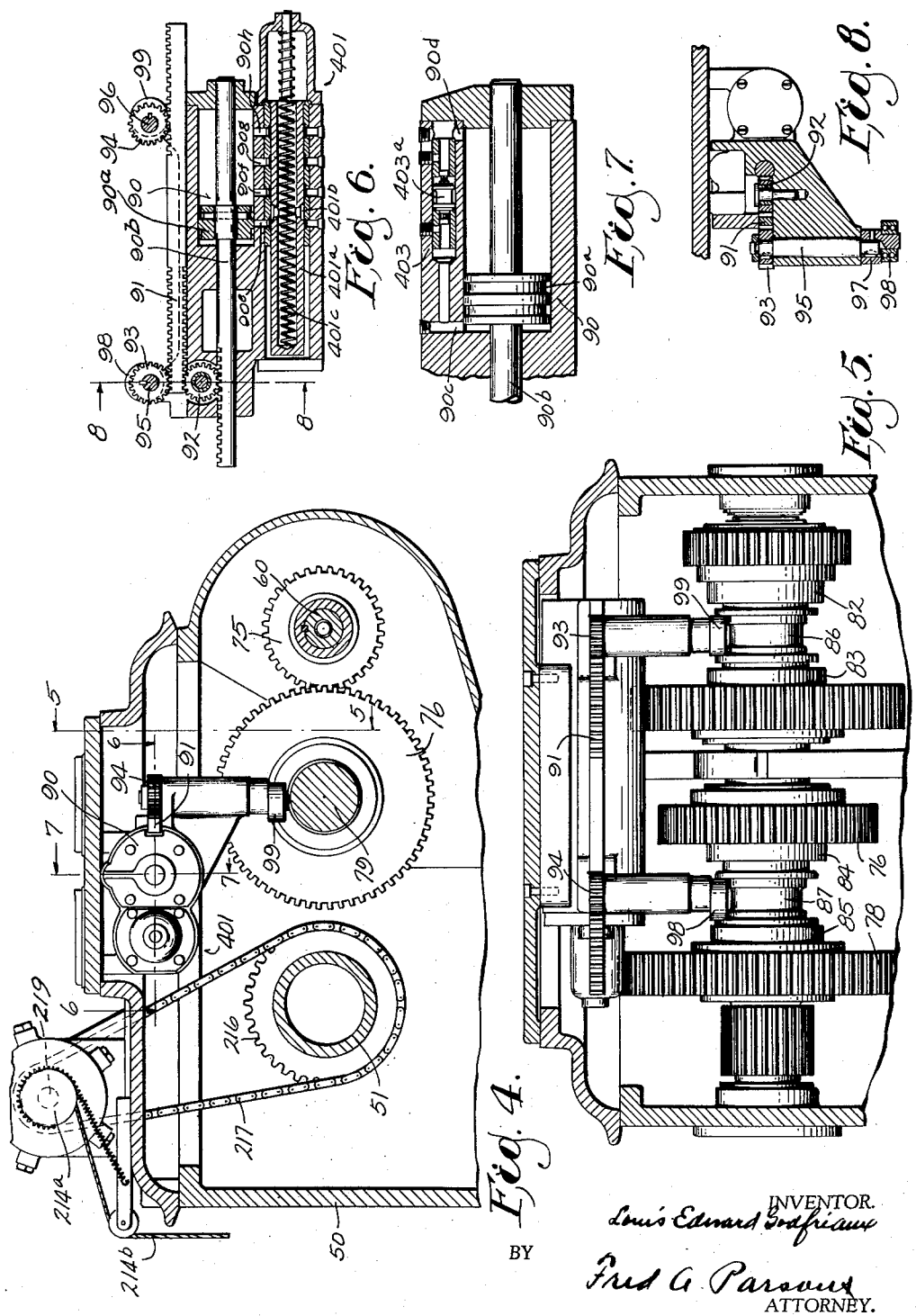

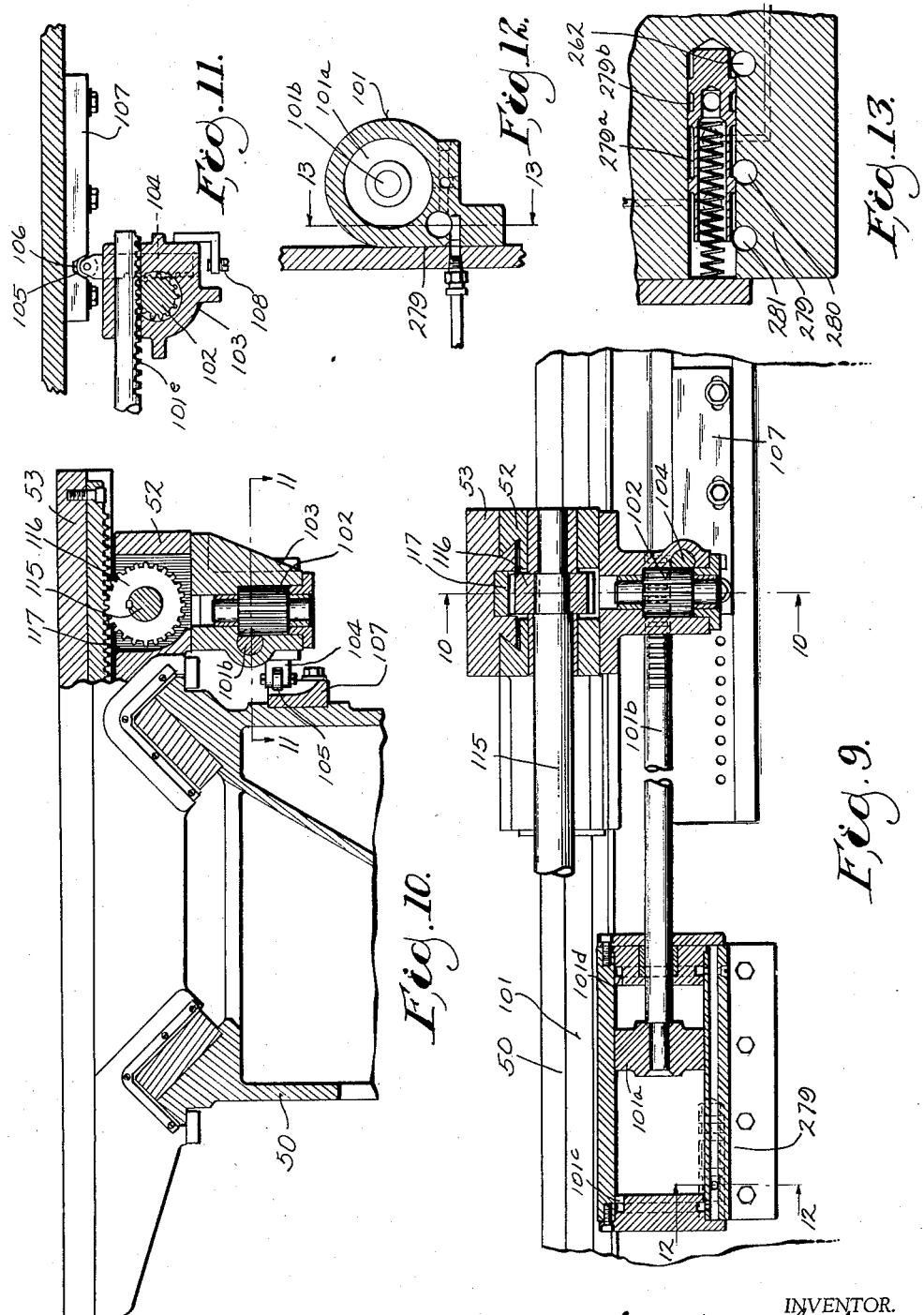

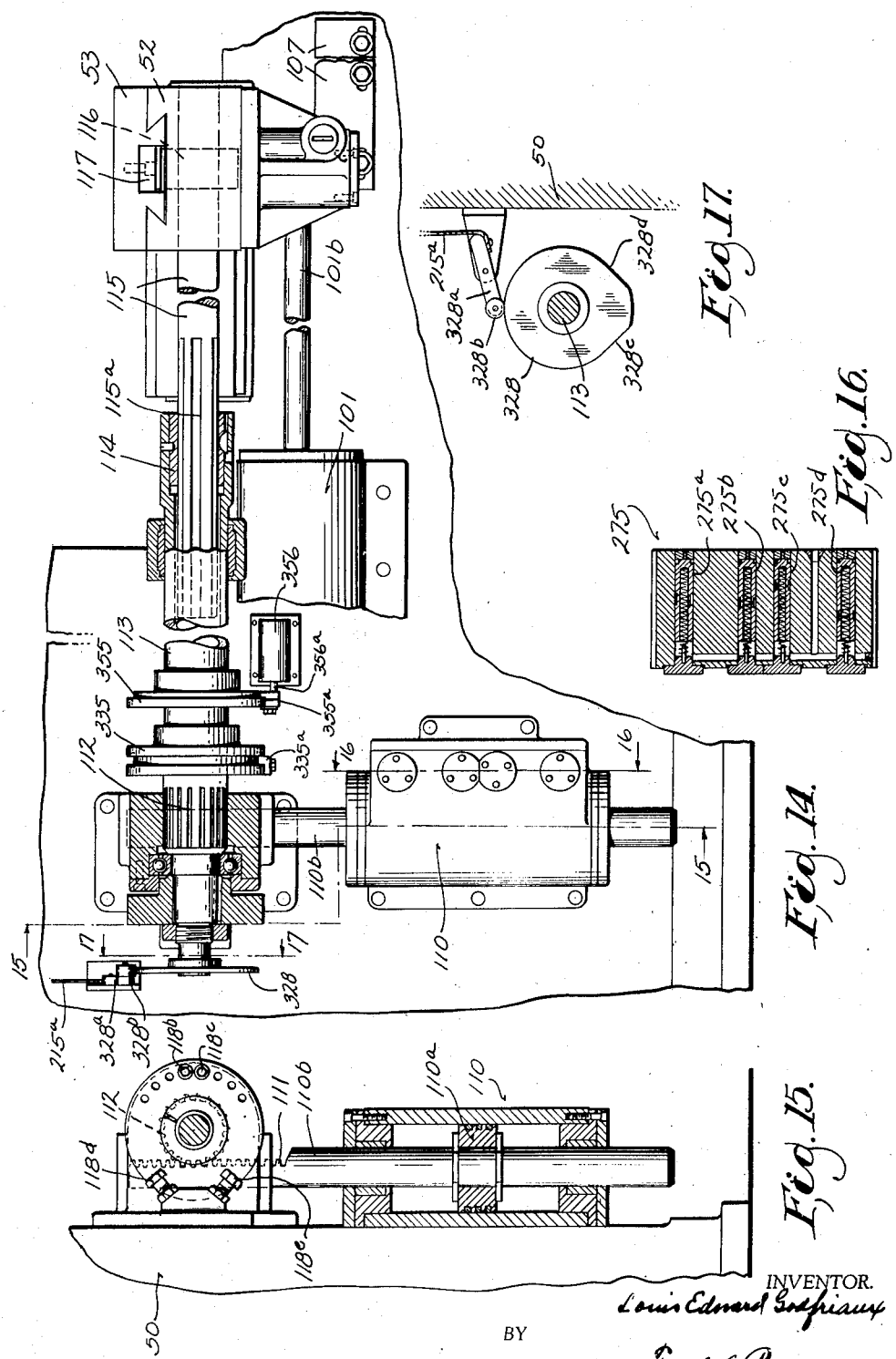

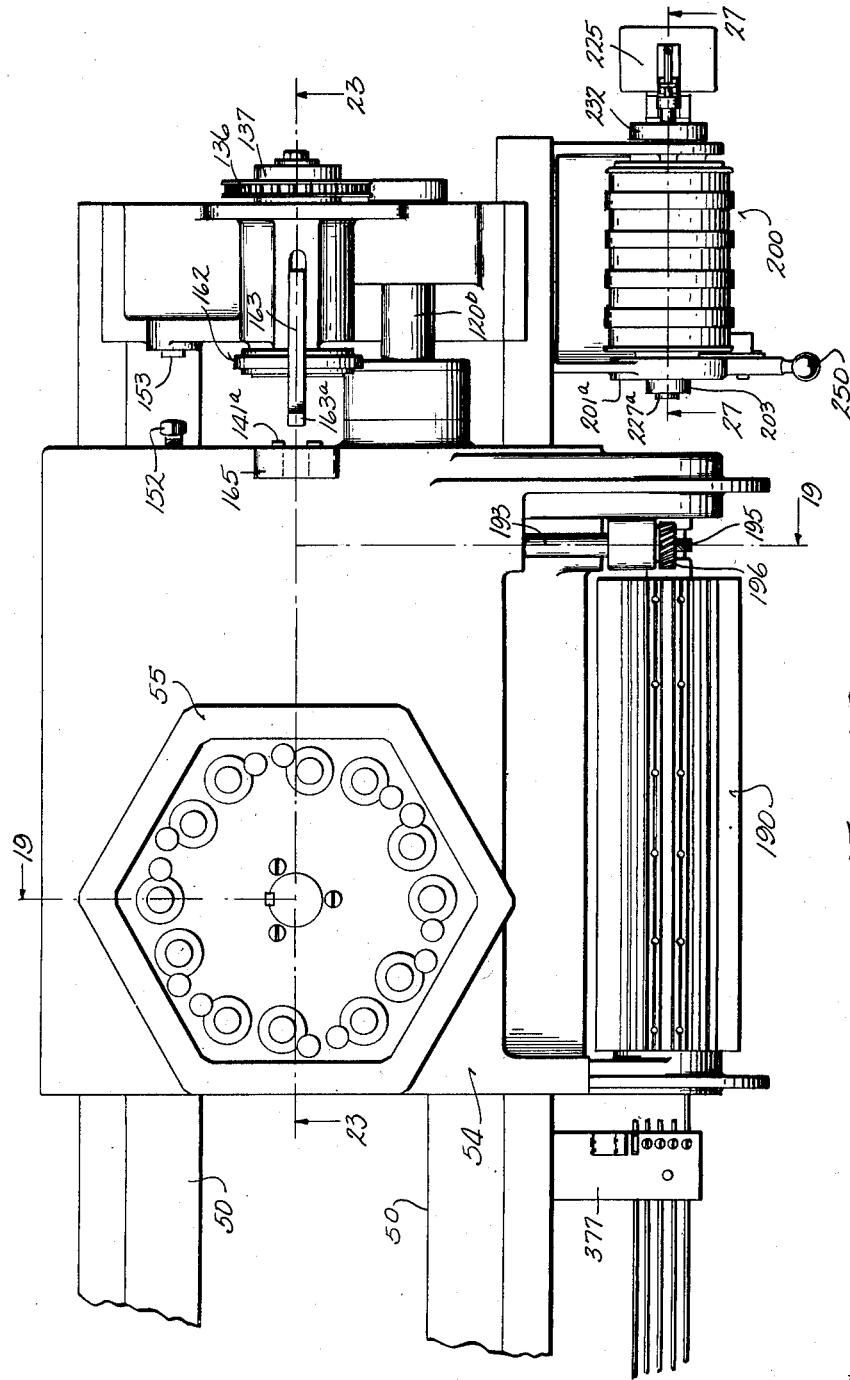

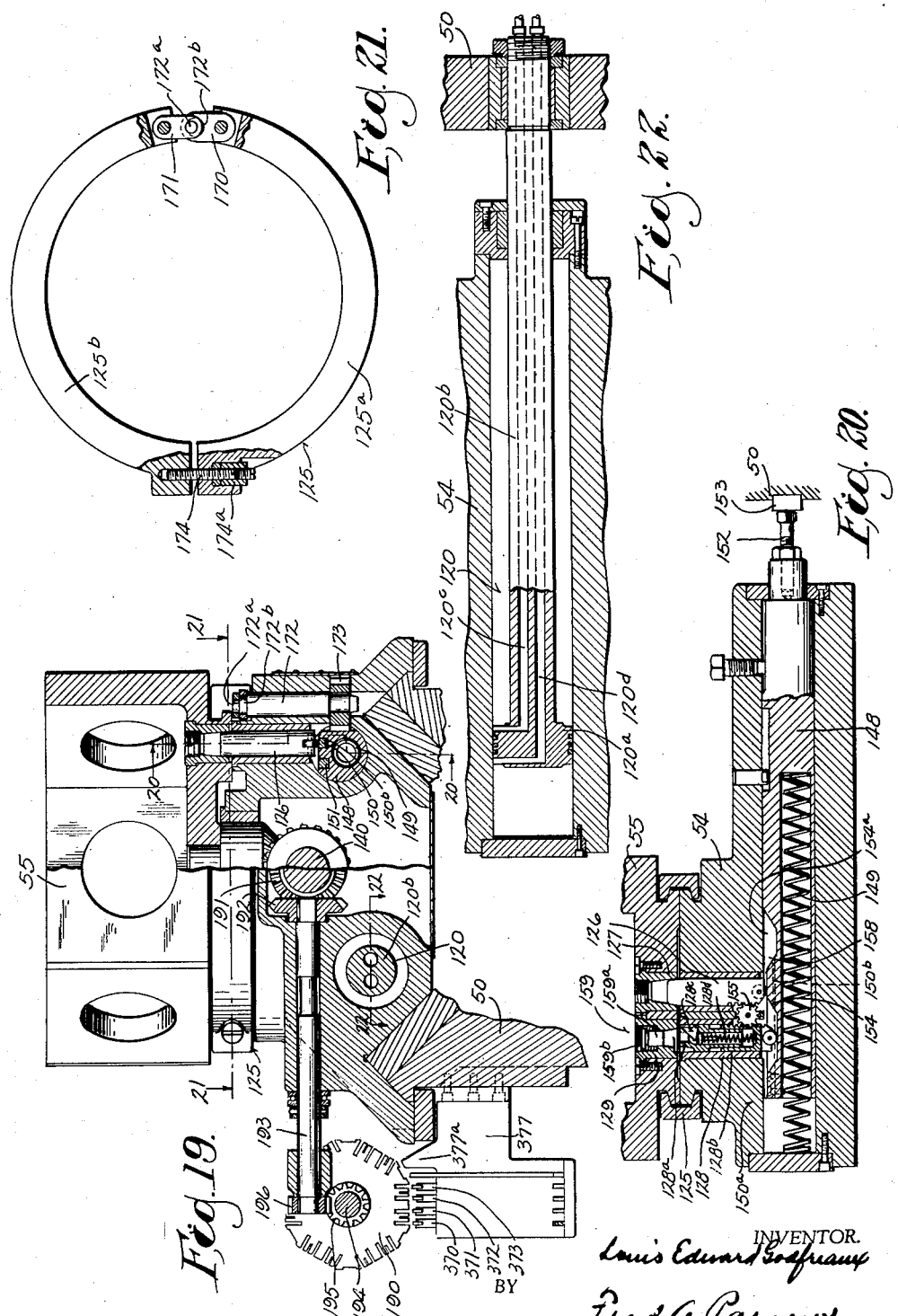

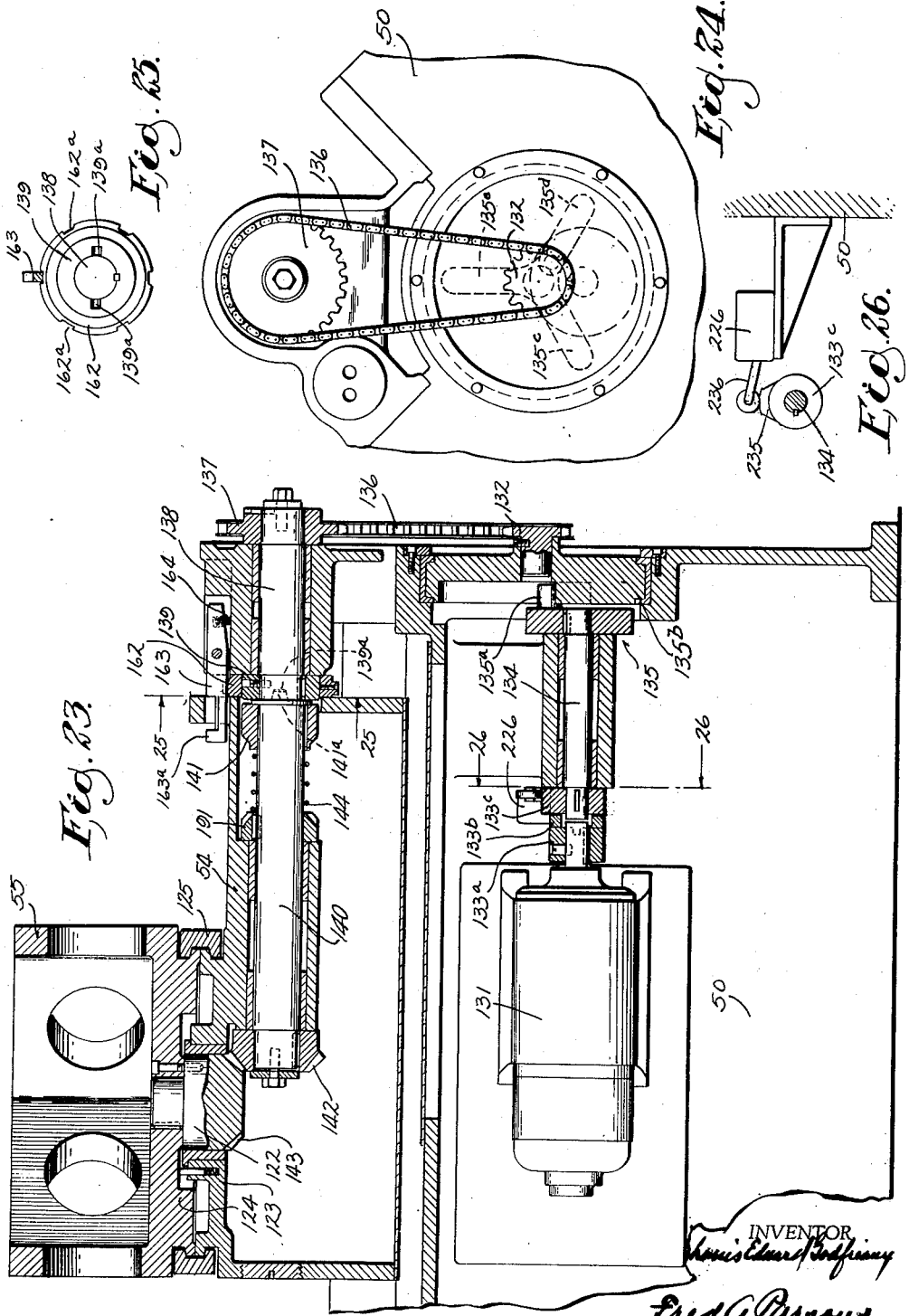

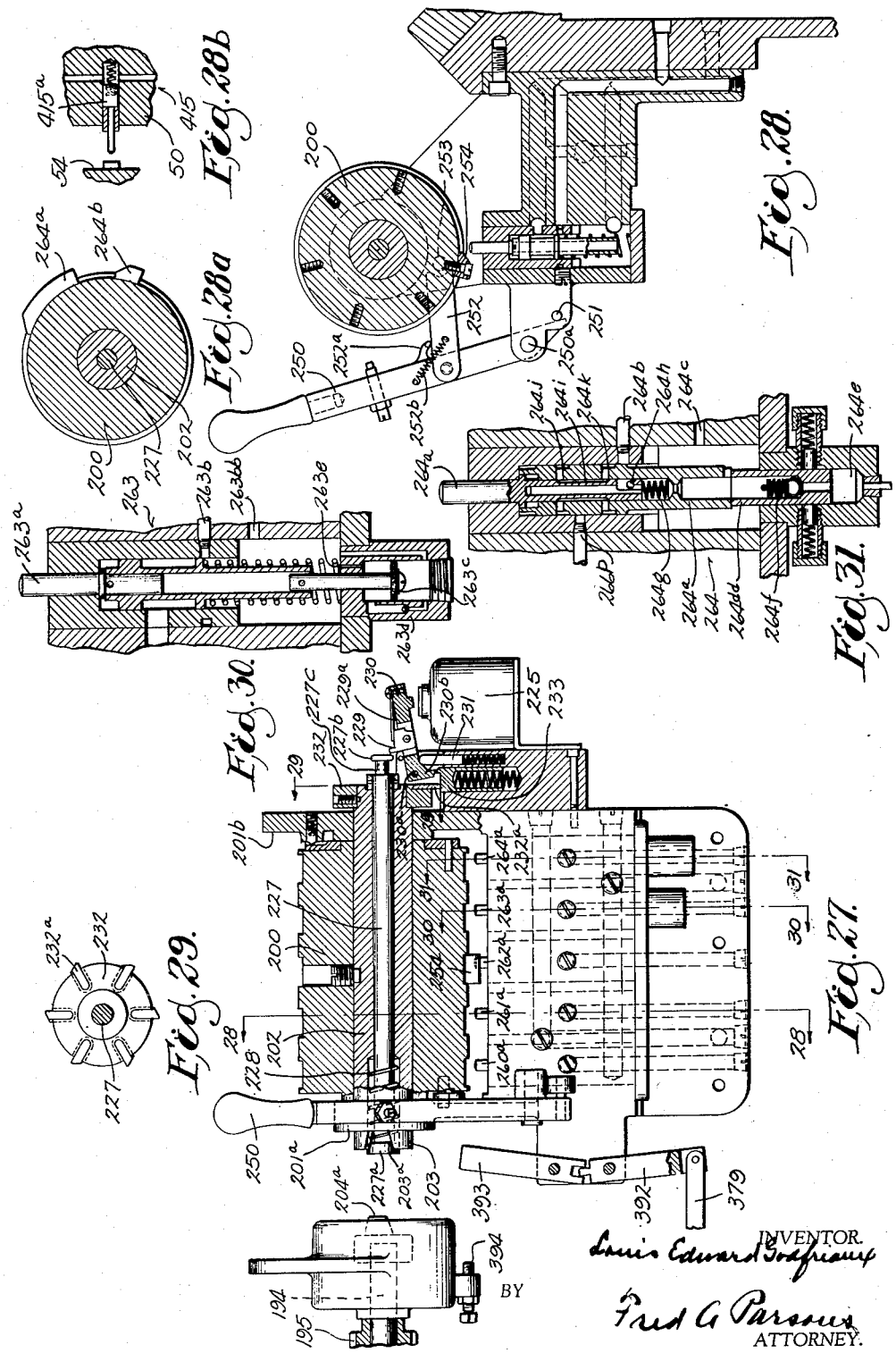

July 14, 1942.　　　L. E. GODFRIAUX　　　2,289,957
MACHINE TOOL TRANSMISSION AND CONTROL
Filed July 17, 1939　　　13 Sheets-Sheet 10
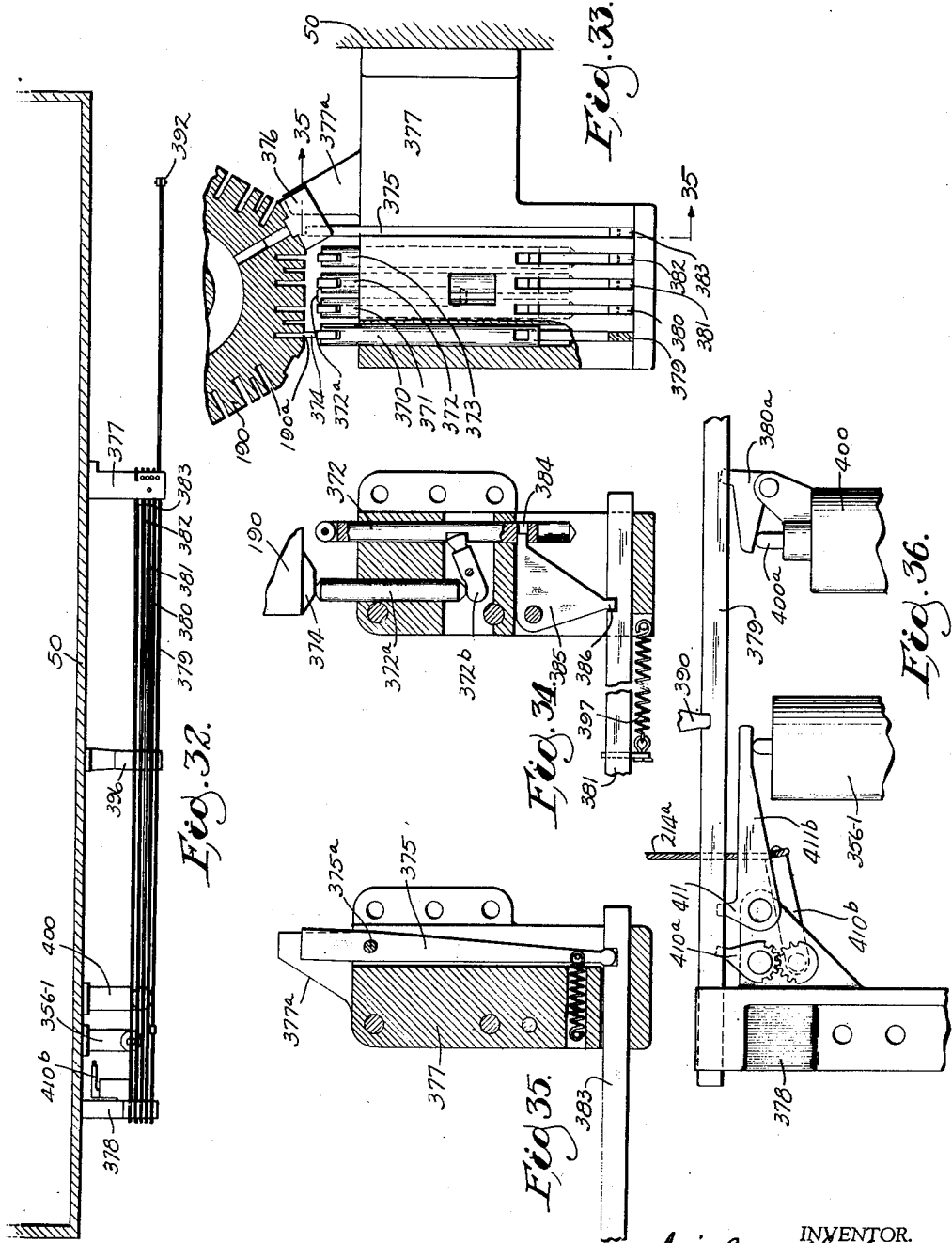
INVENTOR.
Louis Edward Godfriaux
BY
Fred G. Parsons
ATTORNEY.

July 14, 1942.  L. E. GODFRIAUX  2,289,957
MACHINE TOOL TRANSMISSION AND CONTROL
Filed July 17, 1939  13 Sheets-Sheet 11
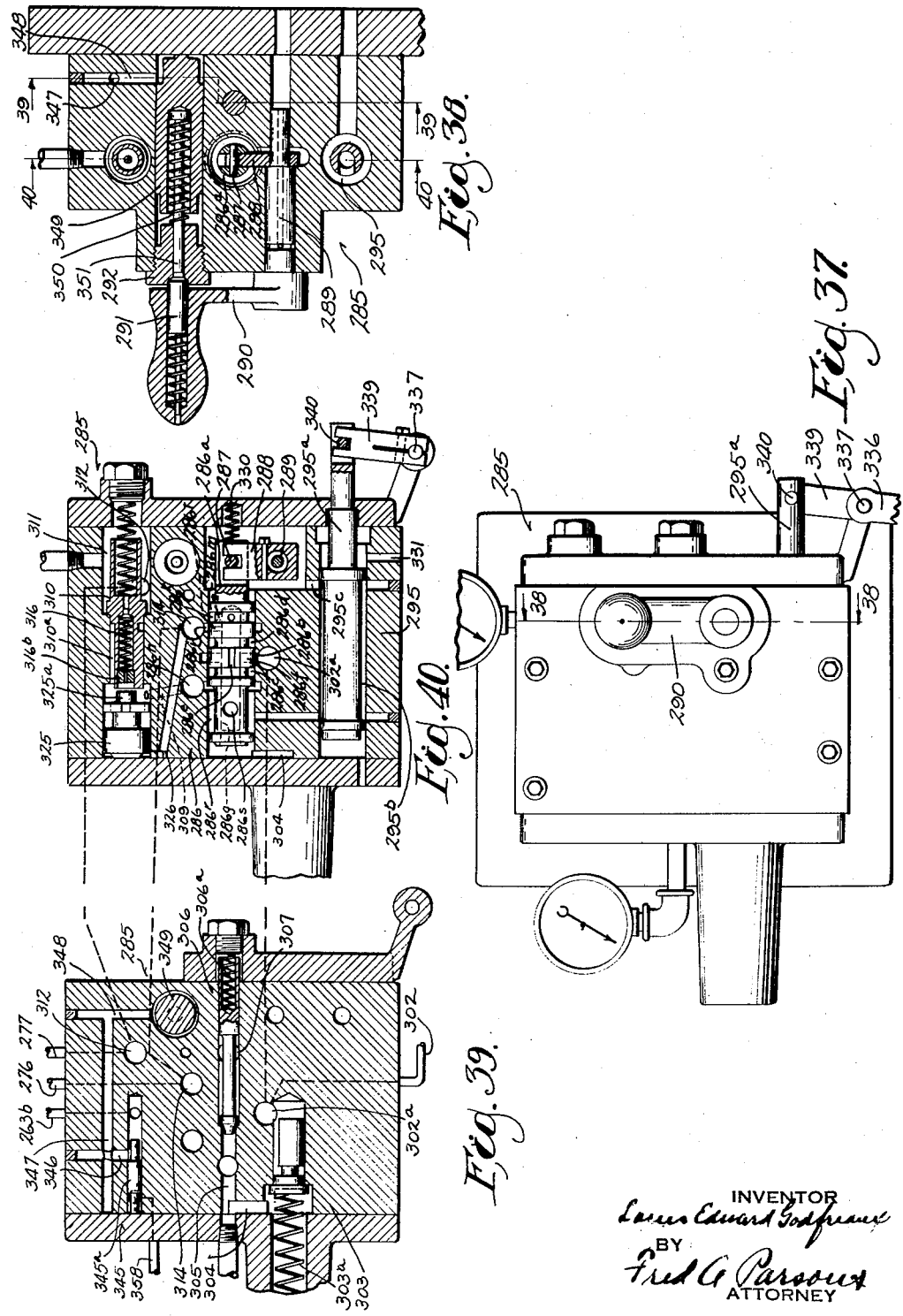
INVENTOR
Lucius Edward Godfriaux
BY
Fred G. Parsons
ATTORNEY

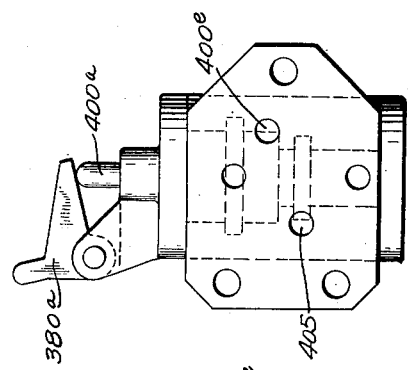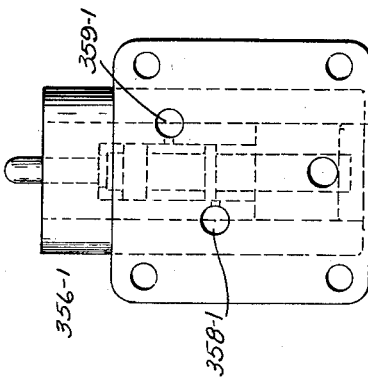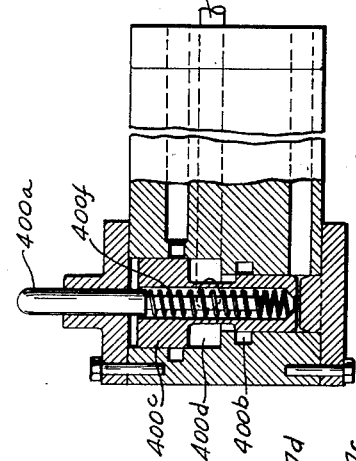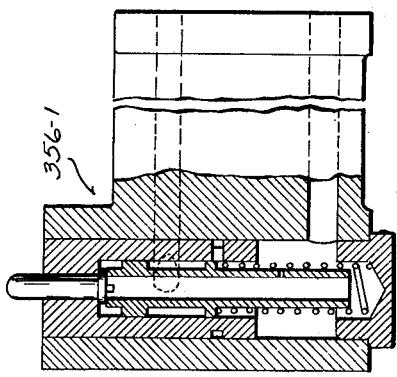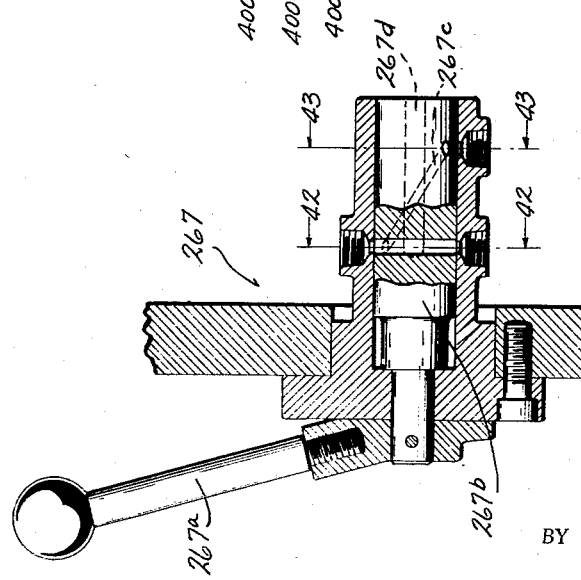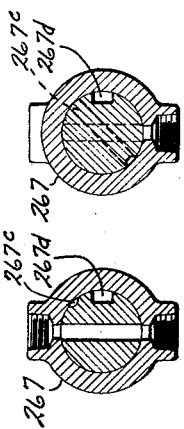

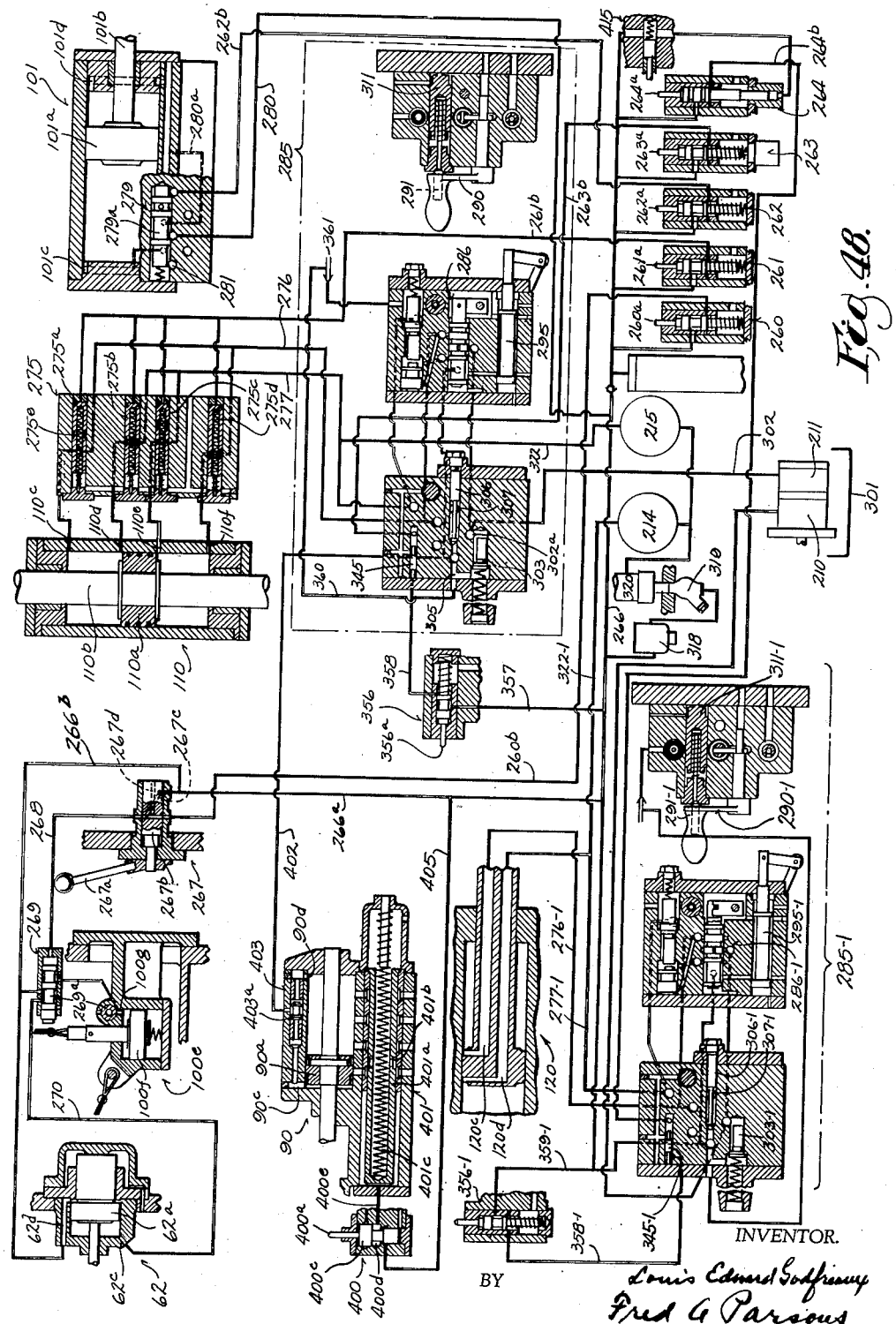

Patented July 14, 1942

2,289,957

UNITED STATES PATENT OFFICE 2,289,957

MACHINE TOOL TRANSMISSION AND CONTROL

Louis Edward Godfriaux, Madison, Wis., assignor to Gisholt Machine Company, Madison, Wis., a corporation of Wisconsin Application July 17, 1939, Serial No. 284,905

27 Claims. (Cl. 29—42)

This invention relates to machine tool transmission and control mechanism and more particularly for lathes, especially turret lathes.

A purpose of the invention is to provide a machine tool comprising tool or work supporting units or supports in an improved structural and operating relationship, and in an improved form as to the individual units.

A further purpose is to provide improved transmission mechanism for tool and work supporting units or supports of a machine tool, and in a form for improved cooperative relationship between different units.

A further purpose is to provide an improved control mechanism for the transmission mechanism of tool and work supports of a machine tool, and particularly to provide controls for the individual supports suited for cooperation and interconnection between the controls of different supports.

A further purpose is to provide transmission and control mechanism which incorporates fluid or hydraulic operated devices in an improved form and relationship.

A further purpose is to provide control mechanism in which both hydraulic and electric operated devices are incorporated, each for preferred individual purposes, and cooperatively interconnected for effecting combination control effects.

A further purpose is to provide an improved automatic control mechanism for machine operation, particularly where the machine cycle includes sub-cycles of operation of different units or supports, and particularly for turret lathes.

A further purpose is generally to simplify and improve the construction and operation of machine tools and of certain tool or work supporting elements thereof, especially for lathes and particularly for turret lathes.

Still other objects will be apparent from the specification, it being understood that the invention includes the methods and structures herein illustrated, described and claimed and such other methods and structure as are equivalent to the methods or structures of the claims.

The same reference characters have been used for the same parts throughout, and in the drawings:

Figure 1 is a front elevation of an automatic turret lathe incorporating the invention.

Figure 2 is a horizontal cross section of the spindle transmission and associated parts of the lathe of Fig. 1, taken along line 2—2 of Fig. 1.

Figure 3 is a vertical section taken along line 3—3 of Fig. 2.

Figure 4 is an enlarged partial vertical section taken approximately along line 4—4 of Fig. 1.

Figure 5 is a partial vertical section taken approximately along line 5—5 of Fig. 4.

Figure 6 is a partial horizontal section taken along line 6—6 of Fig. 4.

Figure 7 is a partial vertical section taken along line 7—7 of Fig. 4 and somewhat enlarged.

Figure 8 is a partial vertical section taken along line 8—8 of Fig. 6.

Figure 9 is an enlarged partial front elevation of a cross slide and carriage mechanism of the machine of Fig. 1, together with some of the operating mechanism, some of the parts being broken away in vertical section.

Figure 10 is a side elevation of the cross slide and carriage from the left in Fig. 9, partly in section along line 10—10 of Fig. 9.

Figure 11 is a partial horizontal section along line 11—11 of Fig. 10.

Figure 12 is a partial vertical section along line 12—12 of Fig. 9.

Figure 13 is an enlarged partial vertical section along line 13—13 of Fig. 12.

Figure 14 is an enlarged partial front elevation of the cross slide and carriage shown in Fig. 9, together with some of the operating mechanism, some of the parts being broken away in vertical section.

Figure 15 is a partial vertical section taken along line 15—15 of Fig. 14.

Figure 16 is a vertical section along line 16—16 of Fig. 14.

Figure 17 is a partial vertical section along line 17—17 of Fig. 14.

Figure 18 is an enlarged plan view of a turret and its carriage, together with some of the control mechanism shown at the right end of the machine of Fig. 1.

Figure 19 is a partial vertical section, taken approximately along line 19—19 of Fig. 18.

Figure 20 is a partial vertical section taken approximately along line 20—20 of Fig. 19.

Figure 21 is a plan view of a clamp ring structure shown in Fig. 19, partly in horizontal section along line 21—21 of Fig. 19.

Figure 22 is a partial horizontal section along line 22—22 of Fig. 19.

Figure 23 is a partial vertical section along line 23—23 of Fig. 18.

Figure 24 is a partial right end elevation of the mechanism of Fig. 23.

Figure 25 is a partial vertical section along line 25—25 of Fig. 23.

Figure 26 is a partial vertical section along line 26—26 of Fig. 23.

Figure 27 is an enlarged partial front elevation of a portion of the mechanism shown at the right in Fig. 1, partly in vertical section along line 27—27 of Fig. 18.

Figure 28 is a partial vertical section taken approximately along line 28—28 of Fig. 27.

Figure 28a semi-diagrammatically shows cam dogs used with a control drum shown in Fig. 27.

Figure 28b semi-diagrammatically shows a control valve device operatively associated with some of the mechanism of Fig. 27.

Figure 29 is a partial vertical section at 29—29 of Fig. 27.

Figure 30 is a partial vertical section taken along line 30—30 of Fig. 27.

Figure 31 is a partial section taken along line 31—31 of Fig. 27.

Figure 32 is a partial horizontal section taken along line 32—32 of Fig. 1.

Figure 33 is an enlarged fragmentary section taken approximately along line 33—33 of Fig. 1.

Figure 34 is a semi-diagrammatic vertical section of some of the mechanism of Fig. 33.

Figure 35 is a vertical section along line 35—35 of Fig. 33.

Figure 36 is an enlarged fragmentary front elevation of some of the mechanism shown at the left end of Fig. 1.

Figure 37 is an enlarged front elevation of a valve unit shown at the left end of Fig. 1.

Figure 38 is a vertical section approximately along line 38—38 of Fig. 37.

Figures 39, 40 are vertical sections respectively along lines 39—39 and 40—40 of Fig. 38.

Figure 41 shows an enlarged partial section taken along line 41—41 of Fig. 1.

Figures 42, 43 are vertical sections respectively along lines 42—42 and 43—43 of Fig. 41.

Figures 44, 46 are respectively partial sections of different control valves of the machine of Fig. 1.

Figures 45, 47 are respectively side elevations of the control valves of Figs. 44, 46.

Figure 48 is a diagram of certain of the control mechanism of the machine of Fig. 1, showing some of its operating relationship.

Figure 49 is a diagram of an electric control circuit for an indexing motor used in the machine of Fig. 1.

The lathe of Fig. 1 includes a bed or main support 50 having an upstanding headstock portion 50a in which an axially horizontal spindle 51, Figs. 1, 2, is rotatably journaled. Slidably guided on suitable ways on bed 50 for longitudinal movement parallel with the spindle axis there is tool carriage 52 which supports a cross slide 53 bodily movable with the carriage and slidably guided thereon for movement transverse to the carriage movement. Also longitudinally slidably guided on bed 50 there is a turret carriage 54 which supports a tool turret 55 for bodily movement with the carriage and index movement about a vertical axis.

The spindle 51 is driven from a multi-speed motor (not shown) which is fixed on bed 50 and having a motor shaft 56 driving a main clutch pulley 57, Figs. 1, 2, through a pulley 58 fixed on the motor shaft and through belts 59. The clutch pulley 57 is rotatably mounted on a shaft 60 which is journaled in the headstock 50a. A main clutch 61 provides an intermediate friction plate 61a which is slidably keyed with pulley 57, and may be frictionally engaged by friction plates 61b, 61c. For alternatively engaging or disengaging the clutch plates there is a piston device 62 having a piston 62a, a piston rod 62b and pressure ports 62c, 62d. Piston rod 62b is connected to operate pivoted clutch levers such as 63, through an anti-friction thrust coupling 64, a rod 65, a pin 66 fixed with the rod and extending through suitable slots in shaft 60 to engage an outer unit 67a of thrust coupling 67 having a relatively rotatable inner member 67b, a member 68 fixed with the inner member 67b and togglemembers such as 69 pivoted at the one end on the member 68 and at the other end with the lever 63.

The drive shaft 60, Fig. 2, is connectible to drive the spindle 51 through a rate changer including meshed gear pairs of different ratio such as 71—72, 73—74, 75—76, 77—78, one of the gears of each pair being fixed on the shaft 60 and the other being rotatably mounted on a shaft 79, which is rotatably journaled in the headstock 50a and connected to the spindle 51 by a pinion 80 fixed on the shaft and a gear 81 fixed on the spindle. The several gears 72, 74, 76, 78 may be selectively clutched to the shaft 60 respectively by clutches 82, 83, 84, 85 which may be of any suitable well-known form, there being a clutch spool 6 shiftable in different axial directions to alternatively engage the clutches 82, 83 and another clutch spool 87 similarly shiftable to alternatively engage the clutches 84, 85. Each of the clutch spools has an intermediate position where neither of the associated clutches are engaged.

The clutch spools 86, 87, Fig. 2, may be shifted by a piston device 90, Figs. 4, 6, having a piston 90a, a piston rod 90b and pressure ports 90c, 90d, Fig. 7, the piston rod being connected to a rack bar 91 by means of a pinion 92. The rack bar 91 also engages pinions 93, 94 respectively fixed on vertical shafts 95, 96 each of which have fixed on their lower ends eccentric members such as 97 as shown in Fig. 8 for the shaft 95, the eccentrics respectively carrying anti-friction rollers 98, 99, Fig. 5. The eccentrics are respectively set at different angles, as shown in Fig. 6, so arranged that as the piston 90a is shifted, by control means later described, the clutches 82, 83, 84, 85, Figs. 2, 5, will be engaged one at a time in different positions of the piston.

A spindle brake 100, Figs. 2, 3, includes a brake drum 100a fixed on the spindle 51 and engaged by a brake band 100b, which is anchored at the one end on a bracket 100c carried by the headstock and at the other end is urged to released position by a spring 100d, but may be urged in braking direction by a piston device 100e providing a piston 100f and a port 100g.

The tool carriage 52 is alternatively longitudinally positioned in a working position, to the left of the position shown in Fig. 1, and in a loading position approximately where shown. For movement of carriage between these positions there is provided a piston device 101, Figs. 1, 9, carried on bed 50, having a piston 101a, a piston rod 101b and ports 101c, 101d, the rod being extended for rack teeth 101e, Fig. 11, to engage a pinion 102 carried in a bracket 103 fixed with the carriage. A plunger 104 also has rack tooth engagement with the pinion and at the one end carries an abutment roller 105 engageable with a locating notch 106 of block 107 which is longitudinally adjustably fixed on bed 50. In the one direction of movement of piston 101a to the left in Fig. 9 the plunger 104 is forced inwardly toward plate 107 and when roller 105 engages the face of the plate the carriage 52 moves to the left until the roller engages locating notch 106, such engagement locking the carriage in working position. In the other direction of movement of piston 101a, to the right in Fig. 9, the plunger 104 moves outwardly against a stop such as 108, Fig. 11, and the carriage then moves to loading position, that is to say, to the end of the right-hand piston travel. Such movements of the carriage 52 are controlled as later described.

The cross slide 53, Figs. 1, 10, has a central position, approximately where shown in Fig. 10, to which it is returned after a forward or cutting stroke in either direction, to right or left in Fig. 10. In each direction the slide is moved forward at relatively rapid or quick traverse rate until cutting tools, not shown, which are suitably fixed adjacent opposite ends on the slide, are about to contact the work piece. The rate is then changed to a relatively slow feed rate to complete the forward movement following which the slide returns to central position at quick traverse rate. The slide movements are effected by a piston device 110, Figs. 1, 14, providing a piston 110a, Figs. 15, 48, a piston rod 110b and ports 110c, 110d, 110e, 110f; the rod being extended for suitable rack teeth 111 to engage a pinion 112 fixed for rotation with a shaft 113 and with a bushing 114 having internal splines slidably engaging external splines 115a on a shaft 115, having fixed thereon a pinion 116, Figs. 10, 14, which meshes with a rack 117 fixed on the cross slide 53. Positive stop means are provided for limiting the movement of cross slide 53 in each direction from the central position shown in Fig. 10, including a stop carrier disc 118, Figs. 1, 15, providing spaced locating holes such as 118a into any of which stops such as 118b, 118c may be fitted to respectively engage adjustable abutment screws 118d, 118e during movement of the cross slide in different forward directions from the central position. The slidably splined engagement of the shaft 115 provides for the longitudinal movement, previously mentioned, of the cross slide and its carriage 52. The feed and quick traverse movements of the cross slide 53 and the control mechanism therefor will later be more fully described.

The turret carriage 54, Fig. 1, is there shown in a loading position, at the extreme of its right-hand movement. From this position the carriage has forward movement to the left, the first portion of such forward movement being at relatively fast quick traverse rate, which is changed to a feed rate as cutting tools, not shown, which are suitably fixed with the turret face then presented to the work, are about to contact the work piece. At the completion of the forward stroke the turret is returned to the loading position at relatively rapid rate. These movements are effected by a piston device 120, Figs. 19, 22, having a piston 120a, a piston rod 120b, and ports 120c, 120d, the piston rod being rigidly fixed with bed 50, the piston operating in a suitable bore in the carriage 54 which forms a cylinder fixed with the carriage and bodily movable therewith. The feed and quick traverse movements of the turret carriage 54, and the control mechanism therefor will later be more fully described.

The turret 55, Figs. 1, 19, is rotatably positioned on the turret carriage 54 by the means of a pivot shaft 122, Fig. 23, which is fixed with the turret and journaled in a top plate 123 of the carriage, the turret providing a bottom plate 124 bearing against the carriage top plate. The adjacent edges of the plates are annular and provide angular surfaces upon which portions 125a, 125b of a clamp ring 125, Fig. 21, may be contracted whereby to rigidly clamp the turret in any of its indexed positions, as later explained. A primary locating plunger 126, Fig. 20, is engageable with primary locating bushings such as 127 in each of the turret index positions, there being also another locating plunger 128 providing an upper portion 128a engageable with bushings such as 129 in each of the turret positions, the plunger 128 also providing a lower portion 128b and a pivoted trigger device 128c urged by a spring 128d, for purposes later explained.

When the turret locating plungers 126, 128, Fig. 20, are withdrawn below their respective bushings and the clamp ring 125 is released the turret 55 may be rotatably power indexed, but only when the turret carriage 54 is in the right-hand limit of its movement, Figs. 1, 18. The power indexing mechanism is as follows:

A motor 131, Fig. 23, is housed in the hollow bed 50 underneath the turret carriage, and when energized the motor drives a sprocket 132 through coupling members 133a, 133b, 133c, a shaft 134 and a crank pin 135a of a Geneva motion device 135, Figs. 23, 24, the Geneva device including a rotatably mounted cam plate 135b providing three equi-angular cam slots 135c, 135d, 135e; the sprocket 132 being fixed for rotation with the cam plate 135b; whereby actuation of shaft 134 at constant speed effects a step-by-step angular movement of 120° of sprocket 132. The sprocket 132 is connected for rotatably indexing the turret 55 through a chain 136, another sprocket 137, a shaft 138, a coupling member 139 having socket portions 139a, 139b and fixed on shaft 138, a coupling member 141 slidably keyed on a shaft 140 and having tooth portions such as 141a adapted to engage the notches 139a, and a pair of meshed bevel gears 142, 143 respectively fixed on the shaft 140 and on the pivot shaft 132.

The ratio of the described train connecting the sprocket 132 and turret 55 is such that the 120° angular movement of the sprocket 132 is reduced to 60° of angular turret movement. The drive from motor 131 to and including the coupling member 139 is carried on bed 50, while the coupling member 141 and the remainder of the train is carried on the turret carriage. As the turret carriage reaches the limit of its right-hand movement the coupling teeth 141a engage the notches 139a and the motor 131 may then index the turret. A spring 144 provides a yielding of the coupling member 141 sufficient to firmly seat the teeth 141a in the notches, the teeth and notches having complementary angular sides for such seating to prevent lost motion in the index train.

For withdrawing the turret index locating plungers 126, 128, Fig. 20, whereby to permit indexing of the turret, and for later reengaging the locating plungers there is mechanism as follows: A control plunger 148, Figs. 19, 20, is slidably fitted in a suitable longitudinal bore in the turret carriage 54 and yieldably urged to the right in Fig. 20 by a spring 149. The control plunger 148 carries configurated cam insets 150, 151, Fig. 19, respectively for the index locating plungers 126, 128, each of the plungers having suitable cam follower rolls at their lower ends, as shown in Fig. 20. During backward movement of the turret carriage, to the right in Fig. 20, an adjustable abutment screw 152 contacts an abutment 153 fixed on bed 50 and plunger 148 is forced to the left in Fig. 20. During this movement the lower portion 128b of plunger 128 is forced upwardly by a cam surface 154 of its cam insert 151 and thereby simultaneously forces the plunger 126 downwardly out of engagement with its bushing, the lower plunger end being received in a cam depression 154a, there being for such simultaneous plunger movement a pinion 155 simultaneously oppositely engaging suitable rack teeth on the different plungers. Both the plungers are then disengaged since the abutment of latch 128c on the bottom of its bushing prevents the upper portion 128a of plunger 128 from entering the bushing at this time. The turret carriage 54 reaches the limits of its backward movement, where the coupling members 139, 141, Fig. 23, are engaged for indexing, as previously described, while both the plungers 126, 128 are disengaged, and the indexing then is initiated as later described. During the index movement the next bushing to be engaged by plunger 128 passes through a position where the latch 128c permits entry of the plunger 128 which then engages its bushing for locating the turret substantially in indexed position. During the next forward movement of the turret carriage, to the left of the position shown in Fig. 20, the spring 154 forces the plunger 148 back toward the relative position shown in Fig. 20, whereby the locating plunger 126 is forced upwardly into engagement with its bushing by a cam portion 158, the pinion 155 simultaneously forcing the lower plunger portion 128b downwardly into a suitable cam depression and this movement also carrying the upper plunger portion 128a downwardly sufficiently for the latch 128c to again engage under the lower face of its bushing, as before.

It will be noted that the final seating of the primary turret locating plunger 126, Figs. 19, 20, is spring pressed to insure full engagement, the cam inset 150 which effects such seating being a cantilever spring fixed with plunger 148 at the one end by screws such as 150a, Fig. 20, and having clearance at 150b, Figs. 19, 20.

If it is desired, during indexing, to pass over one or more turret positions the plunger 128, Fig. 20, is prevented from entering the locating bushings at the corresponding station or stations. This is effected by blocking plugs, such as 159, which are associated with each of the various bushings for plunger 128. The blocking plugs have a lower abutment portion 159a which is normally retained in upper position, as shown, by a threaded portion 159b engaging a suitable threaded bore, but the abutment plug may be advanced by the threads of the bore to stand in a lower position preventing entry of plunger 128 into the bushing. The control mechanism for effecting the multiple index movements required for passing over desired index stations will be later described.

Means are provided to prevent the turret carriage 54 from moving forward, to the left in Figs. 1, 23, unless the indexing of turret 55 has been properly completed. To effect this result a ring 162, Figs. 23, 25, is fixed on the coupling member 139 for rotation with the index train shaft 138, the ring having notches such as 162a at suitable angular spacing to receive a lever 163, pivoted on the bed 50, when the index train is in any of the indexed turret positions, the lever being urged to such engagement by a spring 164. When the lever is engaged in a notch 162a the turret carriage may move forward but if the turret is not properly indexed, whereby the lever is not engaged, an interference portion 163a will be engaged by an abutment portion 165 fixed on the carriage to prevent forward carriage movement.

The plunger 148, Fig. 20, is also used for unclamping the turret clamp ring 125, Figs. 19, 21, prior to indexing, and for subsequently reclamping the turret. The ring portions 125a, 125b are provided with toggle links 170, 171 each pivoted at the one end on the corresponding ring portion and at the other end respectively on different eccentric portions 172a, 172b on a shaft 172 which also has fixed thereon a gear 173 engaging suitable rack teeth on the plunger 148. The angular position of the eccentrics and relationship of the parts is such that as the plunger 148 is shifted to the left, Fig. 20, at the end of the right-hand carriage movement as described, the eccentrics spread the clamp ring portions to unclamp the turret for the index movement, and when the spring 149 forces the plunger in the other direction at the start of the next forward carriage movement, the eccentrics draw the clamp ring members together to clamp the turret, but not until the index locating plunger 126 has seated to locate the turret, as previously described. For adjusting the clamp ring there is provided a stud 174 fixed on the one ring portion and in threaded engagement with a nut 174a carried by the other ring portion.

An indexible control dog drum 190, Figs. 1, 18, 19, is rotatably carried on the turret carriage 54 for bodily longitudinal movement therewith. Referring to Figs. 19, 23, the index train shaft 140 has fixed thereon a bevel gear 191 meshed with a bevel gear 192 fixed on a shaft 193 which is connected to a control drum shaft 194 through meshed helical gears 195, 196; whereby the control drum 190 is indexed correspondingly with turret 55. Suitable dog sets, respectively operative in the different index positions of drum 190 may operate during the longitudinal movement of the turret carriage for selectively actuating control plungers shown in Fig. 33, as will later be fully described.

An indexible control dog drum 200, Figs. 1, 18, 27, is rotatably carried on suitable bracket portions 201a, 201b on bed 50. Drum 200 is fixed on a shaft 202 and when the turret carriage is in its turret index position, that is to say, at the extreme right, Fig. 1, suitable notches such as 203a, Fig. 27, of a coupling member 203 fixed on the shaft 202 are engaged by complementary tooth members such as 204a on a coupling member 204 fixed on the shaft 194. The tooth members 204a have lost motion in the notches, for reasons later explained. When the turret 55 and control dog drum 190 are indexed as previously described the control dog drum 200 is correspondingly indexed through the engaged coupling members. Suitable dog sets, respectively for the different index steps of the turret 55, may operate during the index movement to selectively operate control valve plungers shown in Fig. 27 as will later be more fully described.

Pressure fluid means are provided including two pumps 210, 211, Figs. 1, 48, which may be of any suitable type for furnishing relatively large volume at relatively low pressure, suitable for idle or rapid traverse support movements and for operation of control devices, etc. These pumps are mounted in a unitary housing and both driven from a shaft 211a of a suitable motor, not shown, by any suitable means such as the pulleys and belts of Fig. 1. There are also provided two pumps 214, 215, Figs. 1, 48, respectively for actuation of the turret carriage 54 during its relatively slow feed rate movement and for the relatively slow feed rate movement and the cross slide 53. These pumps are mounted in a unitary housing and both driven from the spindle 51, Figs. 2, 4, through a sprocket 216, a chain 217, a shaft 219 and a suitable sprocket on the shaft. The pumps are each adjustable for change of feed rate delivery by similarly rotatable adjusting members 214a, 215a, Figs. 1, 4. Each pump provides means such as fluid pressure or springs, not shown, for individually continuously urging the pump adjustment to zero delivery position, but adjustment may be made in the other direction by the means of flexible cables 214b, 215b carried around the periphery of the adjusting members of the respective pumps and connected to operating mechanism later described. It will be understood that pumps 214, 215 may be of any of various suitable well-known types for delivery of feed pressure fluid and for adjustment of delivery volume as described.

It will be understood that the tool equipment of the machine normally includes several sets of turret tools, not shown, respectively associated with different lateral faces of turret 55. A cycle of machine operation includes a number of forward and return movements of the turret carriage, each terminating with a return of the turret carriage to the extreme of its right-hand movement, to the position shown in Fig. 1, and with an index movement of turret 55 to present that set of tools in the direction of spindle 51 which will be used in the next forward turret movement.

The turret indexing motor 131, Figs. 23, 49, is actuated through a pressure switch 225, Figs. 27, 49, and a cam operated switch 26, Figs. 26, 49. During the return movement of the turret carriage to the position of Fig. 1 the coupling member 204a, Fig. 27, engages the notch 203a, whereby to connect dog drum 200 for index rotation, as previously described, and during such engagement of the member 204a strikes the head 227a of a rod or plunger 227 and forces the plunger to the right in Fig. 27 against the resistance of a spring 228. During this plunger movement a plunger portion 227b engages a latch 229 pivoted on a lever 230, the latch being urged to the engaging position shown by the means of a spring 229a and the lever, which is pivoted at 230a, being urged to the engaging position shown by the means of a spring pressed plunger 231. The final right-hand position of plunger 227 carries the portion 227b past the latch but in the meantime the switch 225 has been closed and the index motor starts an index movement. As has been previously mentioned the index movement rotates drum 200, whereby a disc 232, Figs. 27, 29, carried on the drum shaft 202, is also rotated. The disc carries several removable and replaceable dogs such as 232a angularly positioned for a dog to be available, in each indexed position of the turret 55, to restrain a spring pressed plunger 233 in its lower position shown, but immediately after the index movement starts and before pressure switch 225 is released from the initial closed position described, the plunger 233 is released from the dog 232a. At this time the lever 230 is pivoted for an abutment portion 230b to stand behind a complementary abutment portion on the plunger 233 and the engaged abutments prevent reverse pivoting of the lever 230 for opening of the switch 225 until index rotation of the disc 232 has brought another dog 232a to force the plunger down again. The switch 225 may then open, since the latch 229 may rise into an annular groove 227c in the plunger 227. For the final positioning of the index mechanism the switch 226, Figs. 26, 49, is relied upon. Switch 226 is normally in closed position but may be opened by a cam portion 235 on the coupling member 133c, Figs. 23, 26, which is fixed on index drive shaft 134, the cam portion shifting a pivoted switch opening lever 236.

It will be noted that removal of some of the dogs 232a, Figs. 27, 29, on the disc 232 will cause the indexing to continue past the turret position corresponding to the dogs removed, whereby the complete rotation of the turret 55 such as is necessary for a complete machine cycle may be effected without loss of time during a machine cycle which requires use of only part of the tool stations provided on the turret. Where indexing proceeds through more than one station the index locating plungers are prevented from engaging as a station is passed over, as previously described.

The circuit of the index motor 131, Figs. 23, 49, also includes an interlock switch 237 which prevents indexing of turret 55 at any time when the cross slide 53 has been moved from its central unloading position. Switch 237 is carried on bed 50 in a housing 237a, Fig. 1, adjacent to a cam 238 fixed on the cross slide actuating shaft 113. Switch 237 includes a lever 239 normally spring urged to closed switch position, but shifted to open switch position by operation of the cam on a plunger 240 except when shaft 113 is in the position corresponding to the central position of cross slide 53.

A cycle of machine operation, as stated, indexes turret 55 through a complete revolution whereby the mechanism previously described would also turn control dog drum 200, Figs. 1, 27, through one revolution, except that there is sufficient lost motion between the coupling tooth members 204a and the engaged notch 203a that at the conclusion of the cycle the control drum 200 may be manually rotated sufficiently to bring into operation the dog set which initiates the next machine cycle. As has been previously pointed out the final return movement of turret carriage 54 during a machine cycle effects the index movement positioning the turret for the next cycle, and the manual rotation of the drum 200 as just mentioned starts the new cycle into operation.

Such initial manual movement of control drum 200 is effected by a hand lever 250, Figs. 27, 28. The hand lever is pivoted at 250a on an extension of the bed bracket portion 201a and urged by suitable means, such as a spring, not shown, to the position shown in Fig. 28, determined by a stop pin 251. Pivoted on the hand lever there is an actuator arm 252 normally urged against a stop 252a as by a spring 252b. A pin 253 is carried on control drum 200 and at the end of a machine cycle stands in the angular position shown in Fig. 28 where a forward movement of lever 250 will engage the notched end of actuator arm 252 against the pin whereby to angularly shift dog drum 200 sufficiently for removable and replaceable dogs, such as 254, to selectively depress any of the control plungers shown adjacent the drum in Fig. 27. It will be understood that dogs such as 254 may be suitably positioned in any of the dog grooves such as 254a respectively aligned with the different plungers, and that the dogs may be of various types. A dog such as 264a, Fig. 28a, for example, will maintain the control plunger depressed during an entire cycle of index and forward and return movement of carriage 54, while a dog such as 254b will pass over and release the control plunger during an index movement, Referring to Figs. 27, 48, control plungers 260a, 261a, 262a, 263a, 264a are respectively provided for the valves 260, 261, 262, 263, 264. Each of the valves receives fluid from a pressure fluid line 266, supplied with pressure fluid from pump 210, as later explained.

The dog operable valve 260, Figs. 27, 48, controls the automatic operation of the spindle clutch 61 and brake 100, Figs. 2, 48. The valve plunger 260a is continuously spring urged upwardly in Fig. 48, whereby the pressure fluid is normally cut off and a line 260b is connected to a drain, but if the valve plunger is depressed by dog operation as just mentioned pressure fluid from line 266 enters the line 260b through which the fluid passes to a manually operable control valve 267, having a hand lever 267a for rotation of a valve spool 267b. With the hand lever 267a in the position shown the pressure fluid from line 260b will pass through the valve spool 267b and through a channel 268 will shift a valve plunger 269a of a pressure valve 269 to the left in Fig. 48, to the position shown, the valve plunger being normally urged to the right by a spring not shown. The smaller area end of piston 62a of the clutch operating piston device 62, Figs. 2, 48, is continuously supplied with pressure fluid from the pressure line 266 through the lines 266a, 266b and the port 62d, whereby the piston 62a is continuously urged to the left in clutch disengaging direction, but with the valve member 269a in the left position shown the larger area end of piston 62a is also connected to the pressure line, through a channel 270 and the port 62c, whereby to force the piston to the right to engage clutch 61. At the same time the left position of valve member 269a connects port 100g of the brake piston 100f, Figs. 2, 48, to a drain, whereby the spring 100d releases brake 100. In the other position of control valve 260, that is to say, when the valve plunger 260a is not depressed by a dog and the fluid pressure to line 260b is cut off, the valve member 269a will stand to the right of the position shown in Fig. 48. In such position the port 62c of the clutch operating piston device 62 will be connected to a drain whereby clutch 61 will be disengaged, while the port 100g of the brake piston 100f will be connected to the pressure line 266b, whereby to operate brake 100, and the spindle 51 will stop.

It will be noted that the control from valve 260 for starting and stopping the spindle 51 also effects corresponding starting and stopping of the feed pumps 214, 215, which are connected to be driven from the spindle as previously described.

The hand lever 267a of manual control valve 267, in addition to the position described for automatic control of spindle start and stop from valve 260, has also two other angular positions for the purpose of alternative manual control of the spindle and brake. In each of these other angular positions the line 260b is cut off from channel 268 by the valve spool 267b whereby the position of control valve 260 has then no effect on the starting and stopping of the spindle. In one of the angular positions the channel 268 is connected to the continuous pressure line 266a by a cross channel 267c, whereby to shift pressure valve member 269a to release brake 100 and engage the spindle clutch 61 as previously described. In the other angular position of hand lever 267a the channel 268 is connected to a drain groove 267d, whereby the brake is engaged and the clutch is disengaged.

The dog operable valve 261, Figs. 27, 48, automatically controls valve means associated with the piston device 110, Figs. 15, 48, for determining whether the cross slide 53 will move in the one or the other direction from its central position shown in Fig. 10. The valve plunger 261a is continuously spring pressed upwardly in Fig. 48, whereby the pressure fluid from the line 266 is normally cut off and a line 261b is connected to a drain, but if the valve plunger is depressed by dog operation as described the pressure fluid is admitted to the line 261b and connected to various ports of a valve unit 275, Figs. 16, 48, the different ports being respectively operative when supplied with pressure fluid to effect movement to the left in Fig. 48 of different valve plungers 275a, 275b, 275c, 275d, these plungers each being continuously urged to the right by the springs shown. Each of the valve plungers provides an annular groove such as the groove 275e for the valve plunger 275a, but differently spaced in such manner that when all the valve plungers are in their spring urged position to the right in Fig. 48 a line 276 is cut off, as shown, by the valve plunger 275a from connection to the port 110c, and connected through the annular groove of plunger 275d to the port 110f of piston device 110, while a fluid line 277 is connected through the annular groove of plunger 275b with the piston port 110d and cut off by the valve plunger 275c from the piston port 110e. In the other position of the valve plungers, to the left of the position shown, as effected when pressure fluid is supplied through control valve 261, the fluid line 276 is connected with the piston port 110c and cut off from port 110f, while the line 277 is cut off from port 110d and connected to port 110e. Thus, when line 277 is connected with a pressure fluid supply and line 276 to a drain, as later described, the piston device 110 will move the cross slide 53 in the one or the other direction from the central position shown in Fig. 10, accordingly as the valve 261 is depressed by the drum dog, or is spring urged to its upper position, Fig. 48.

The dog operable valve 262, Figs. 27, 48, automatically controls the alternative positioning of the cross slide carriage 52, either in the working position as determined by the engagement of the plunger roll 105, Figs. 10, 11, with the notch 106 of the adjustable stop block 107, or in the withdrawn position, to the right of the carriage position shown in Fig. 9. The valve plunger 260a is continuously spring urged upwardly in Fig. 48, whereby the pressure fluid from the line 266 is normally cut off and a line 262b is connected to a drain, but if the valve plunger is depressed by dog operation as previously described the pressure fluid is admitted to the line 262b and connected to a valve device 279, Figs. 13, 48, which is associated with the cross slide carriage piston device 101, Figs. 9, 48. The valve device 279 is continuously spring urged to the right, Figs. 13, 48, to the position there shown, in which position pressure fluid derived from pressure line 266 through a line 280 is connected through an annular valve groove with the port 101d of the piston device, as indicated by the dotted channel 280a, Fig. 48, while the piston port 101c is connected to a drain port 281. But when the control valve 262 is depressed the pressure fluid in the line 262b shifts valve plunger 279 to the left of the position shown, whereby the piston port 101d is connected to the drain 281 through an annular valve groove 279b and a central bore of the valve plunger shown in Fig. 13, while the port 101c receives pressure fluid from the line 280. Thus, when control valve 262 is dog operated the piston device 101 and cross slide carriage 52 are shifted to the right, Figs. 9, 48, such carriage movement, as will be apparent from previous description of the structure, first withdrawing the carriage locating plunger 104, Figs. 10, 11, from the notch 106 which adjustably determines the working position of the carriage 52 and cross slide 53. But when control valve 262 is released from the dog the piston 101 and the carriage 52 move to the left, Figs. 9, 48. At the beginning of such left mevement the locating plunger 104 is moved forward to ride on the face of the locating block 107 and when the carriage reaches the working position adjustably determined by the block, the plunger roll 105 enters the notch 106 and rigidly retains the carriage in the working position thus determined.

The dog operable valve 263, Figs. 30, 48, operates in combination with a control valve unit 285, Figs. 1, 37, 48, for control of movements of cross slide 53.

The control valve unit 285 includes a valve 286, Figs. 40, 48, having a valve plunger 286a which has a central position, where shown, from which it may be shifted either to right or left, the plunger being yieldably retained in the central position by a pin 287, Figs. 38, 40, a lever 288 fixed on a shaft 289, a hand lever 290, also fixed on the shaft and a spring pressed plunger 291 yieldably engaging a suitable configuration in a bushing 292. Valve plunger 286 may be urged in either direction as determined by the position of a valve 295, Figs. 40, 48, having a valve plunger 295a, as will be later described.

The valve unit 285 primarily receives pressure fluid from the pump 211, Figs. 1, 48, the fluid being drawn from a reservoir such as 301 and delivered through a channel 302, Figs. 39, 48, to a passage 302a of the valve unit. A primary relief valve 303, of any suitable type, maintains the supply fluid at pressure predetermined by spring 303a and by-passes any surplus fluid through a chamber 304, a passage 305 and a secondary or back-pressure relief valve 306 which maintains a pressure predetermined by a spring 306a and by-passes excess fluid to a drain 307. The passage 302a, Figs. 39, 40, supplies pressure fluid to an annular port 286b of the valve 286. In any of the positions of valve plunger 286a the pressure fluid fills annular grooves 286c, 286d, there being longitudinal grooves such as 286e continuously communicating with the annular port 286b.

In the central position of valve plunger 286a, which is shown in Fig. 40, the pressure fluid in port 286b is by-passed through cross passages such as 286f and a central bore 286g to the chamber 304, Figs. 39, 40, and thence through the back pressure relief valve 306 and drain 307.

In the left-hand position of the valve plunger 286a, to the left of the central position shown in Fig. 40, the by-pass outlet through the cross passages 286f is cut off, and pressure fluid is delivered to a valve port 286h from which it passes through a channel 309 to overcome the pressure of a spring pressed one-way valve plunger 310, the fluid passing through a groove 310a to unseat the valve plunger and enter a chamber 311, from which it passes through a channel 312, Figs. 39, 40, to the line 277 which is connected through the valve unit 275, Fig. 40, for operation of the cross slide piston device 110 as previously described. The pressure fluid in line 277 may operate the piston 110a in either forward direction from the cross slide central position of the piston shown in Fig. 40, accordingly as the valves of unit 275 have been positioned by dog operation of control valve 261, as previously explained. In the position of valves 275a, 275b, 275c 275d shown in Fig. 48 pressure fluid from line 277 is directed to port 110d of piston device 110 and the piston 110a moves downwardly, Figs. 15, 48, the fluid from the port 110f passing out through valve 275d to the line 276, this line being connected for return of fluid in the left-hand position of the valve plunger 286a, through a passage 314, Figs. 39, 40, an annular port 286i of valve 286, an annular groove 286k in the valve plunger and a cross passage 286m which communicates with the axial bore 286g, whence the fluid passes to the chamber 304, Figs. 39, 40, and surplus fluid passes out through the back pressure valve 306 and drain 307 as previously described.

In the right-hand position of the valve plunger 286a, to the right of the central position shown in Fig. 40, the pressure fluid from the annular port 286b is cut off from outflow through the cross passages 286f, the same as for the left position of the valve plunger, previously described, but in the right-hand valve plunger position the pressure fluid passes to the annular valve port 286i and thence through the passage 314, Figs. 39, 40, to the line 276. Provided the valve positions of the valve unit 275 remain the same as just described, that is to say the same as shown in Fig. 48, the pressure fluid will now be applied to the port 110f of piston device 110, thereby to return the piston 110a and the cross slide 53 toward the central position occupied prior to the movement just described for the left-hand position of plunger 286a. During this return movement fluid from the port 110d of piston device 110 passes out through the valve 275b and through the line 277, Figs. 39, 48, passage 312, Figs. 39, 40, a one-way valve 316, the passage 309, ports 286b, an annular groove 286r, and a cross passage 286s into the axial bore 286g and thence to the chamber 304, Figs. 39, 40, and through the back pressure valve 306 to the drain 307.

The successive left and right positions of valve plunger 286a with the position of the valve unit 275 shown in Fig. 48, effect forward movement of the cross slide 53 in the one direction from the central position shown in Fig. 10, followed by return movement to its central position. It will also be apparent from the preceding description that when the dog controlled valve 261 has been operated to effect the other position as previously described of the valves of valve unit 275, the same successive left and right positions of valve plunger 286a will effect forward movement of the cross slide in the other direction from its central position followed by return movement thereof. In other words the direction of the cycle of forward and return movement from the central start position of piston 110a and cross slide 53 which may be effected by left and right movements of valve plunger 286a is predetermined by the dog controlled operation of the valve 261. In either cycle direction the return movement positions the piston 110a and the cross slide again in central position since the piston 110a can move no farther than the port 110d or 110e which respectively provide outlet for the fluid in the cylinder while the piston is effecting the return movement following forward movement in different directions.

The cycles of cross slide movement just described would effect forward and return movement entirely at quick traverse rate from the pump 211. It is ordinarily desirable to effect at least the latter part of each forward movement at a relatively slow feed rate determined by the adjustment of the cross slide feed pump 215, Figs. 1, 48. Both the pumps 214 and 215 are continuously supplied with pressure fluid from the channel 266, Fig. 48, through a pressure reducing valve 318, a strainer 319 and a gas bleeder device 320 of any suitable type, and for the purpose just mentioned the delivery port of pump 215 is connected through a line 322 to the line 277, which is the line that provides the pressure fluid, as previously described, in either direction of forward movement of piston 110a and cross slide 53. As later explained when feed rate movements are to be effected the valve plunger 286a is positioned in its central position where fluid from the pump 211 is by-passed as previously described. In such case the one-way valve 310, Fig. 40, will be closed, whereby the feed pump fluid in line 277 cannot by-pass through the connecting channels and this valve. But the feed fluid could, unless prevented, by-pass through the one-way valve 316, Fig. 40, and to prevent such effect there is provided in the valve unit 285 a plunger 325, Fig. 40, having a blocking pilot portion 325a. When the valve plunger 286a is in the central position shown in Fig. 40, for effecting a forward feed rate of piston 110a and cross slide 53, as stated, the plunger 325 is urged to the right in Fig. 40 by the fluid pressure established by the back pressure valve 306, the pressure fluid being connected with the plunger through a channel 326, Fig. 40, the annular valve port 286i, and a cross channel such as 286t which communicates with the central bore 286g, which is then filled with fluid under pressure from the back pressure valve 306. The resulting movement of plunger 325 to the right in Fig. 40 engages the blocking pilot portion 325a to close a bore 316b through which fluid might otherwise be released through the one-way valve 316.

Forward movement of piston 310a effected by feed rate fluid supplied to the line 277 as just described will effect a return of the fluid displaced by the piston through the line 376 which, in the central position occupied by the valve plunger 286a during feed movement, is returned to the central bore 286m through the cross channel 286t, to eventually escape to drain 307 through back pressure valve 306.

Although the cross slide feed pump 215 is continuously connected, as described, to the forward line 277, Fig. 48, the central or feed position, Fig. 40, of valve plunger 286a does not necessarily effect a feed movement. For one reason the pumps 214, 215 are not rotating when the main clutch 61 is interrupted, as previously pointed out. Also, as previously stated, the pumps are normally urged to zero delivery position of adjustment and deliver no fluid unless they have been adjusted out of such position. For adjusting the pump 215 to a preferred feed rate position in either direction of forward movement of cross slide 53 there is provided a feed rate control cam 328, Figs. 1, 14, 17, which is fixed on the cross slide actuating shaft 113. A pivoted lever 328a carries a cam follower roll 328b at the one end and at the other end is attached to the adjusting cable 215a of the feed pump. In the central position of the cross slide 53, shown in Fig. 10, the cam 328 and follower 328b stand in the zero delivery pump adjusting position shown in Fig. 17, but as the cam rotates during either forward direction of cross slide movement the one or the other of cam portions such as 328c, 328d will adjust the pump 215 for a feed rate determined in each instance by the rise of the cam.

From the foregoing it will be apparent that feed pressure fluid applied to channel 277 from pump 215 will operate for forward feed movement of the cross slide 53 in either direction of the forward and return cycle of movement thereof determined by the positioning of the valves of valve unit 275, which in turn is determined by the dog operated valve 261.

As has been stated, the valve plunger 286a, Fig. 40, for effecting the forward and return cycles of movement of cross slide 53 may be yieldably retained in central or feed position by a spring plunger 291, Fig. 38, and may be urged toward either the left-hand position effecting forward quick traverse or toward the right-hand position effecting return quick traverse according to the position of the valve plunger 295a, Fig. 40. Plunger 295a has a right-hand position, as shown, in which the fluid pressure which is continuously available in the annular groove 286r of valve plunger 286a operates through an annular groove 295b and a channel 295c to apply fluid pressure to the right end of valve plunger 286a, which equalizes the pressure on both ends of the valve plunger, whereby a spring 330 operates to urge the valve plunger 286a to the left. In the other position of plunger 295a, to the left of the position of Fig. 40, the annular groove 295b will be cut off from the channel 295c and pressure on the right end of valve plunger 286a will be relieved through a vent channel 331, whereby the continuous fluid pressure on the left end of valve plunger 286a will force this plunger to the right, against the resistance of the spring 330.

The right and left-hand positions of the valve plunger 295a, Fig. 40, are dog controlled in accordance with the movements of the cross slide 53. To effect the result a dog drum 335, Figs. 1, 14, is fixed on the cross slide actuating shaft 113 and carries suitable dogs, such as 335a, angularly adjustable on the drum periphery, there being a trip lever 336, Figs. 1, 37, having an operating end projecting into the path of the dogs, the lever being fixed on a shaft 337, Figs. 37, 40, upon which is also fixed a lever 339 engaging a shifter pin 340 carried on the end of the valve plunger 295a.

A cycle of forward and return movement of the piston 110a and cross slide 53 returns the valve plunger 286a, Fig. 40, to the central position in which it is yieldably retained by the spring plunger 291, Fig. 38, as previously described, and also returns the cross slide 53 to its central position shown in Fig. 10, as will appear. During the return movement a dog such as the dog 335a, Figs. 1, 14, on the dog drum 335 also has effected the right-hand position, Fig. 40, of valve plunger 295a, whereby valve plunger 296a is being urged to its left-hand position for the next forward movement of cross slide 53, but such left-hand valve plunger position cannot then be effected because of the engagement of the spring plunger 291, as stated. At this time, although the valve plunger 286a is in its central or feed position there is no feed movement effected, the pump adjusting cam 328, Fig. 17, then being in the zero delivery position there shown.

With the parts in the position just stated at the end of a previous cycle a new cycle of forward and return movement of piston 110a and cross slide 53 may be started when the dog drum 200, Figs. 27, 28, is initially moved as previously described by the hand lever 250 at the beginning of a machine cycle, or any indexing of the dog drum 200 during the machine cycle. To start the new cycle there will be a suitable dog operating the valve plunger 261a, Figs 27, 48, as previously described to adjust the valves of valve unit 275 to effect the forward movement of the new cycle in the desired direction from the central position of the cross slide as shown in Fig. 10. At the same time the valve plunger 263a, Figs. 27, 30, 48, is temporarily depressed by a dog suitably formed to pass over the plunger during the drum index movement. The valve plunger 263a is continuously spring urged upwardly whereby pressure fluid from the lever 266 is normally cut off and a line 263b is connected to a drain channel 263bb but when the valve plunger is depressed, as stated, the pressure fluid passes through line 263b to a floating valve 345, Fig. 39, forcing the valve plunger 345a to the left, to the position shown, whereby pressure fluid passes through channels 346, 347, Fig. 39, and 348, Figs. 38, 39, to operate a plunger 349 against the resistance of a spring 350, thereby to shift a rod 351 to disengage the spring plunger 291 from its position retaining valve plunger 286a in central position. The dog operated valve plunger 263a, Fig. 30, carries a piston 263c operating in a cylinder providing a check valve 263d and a restricted opening 263e, the construction permitting substantially unrestricted movement downwardly but preventing the spring urged return of the valve plunger 263a to its upper position until the spring plunger 291, Fig. 38, has been shifted to release valve plunger 286a, as stated.

When the valve plunger 286a, Fig. 40, has been released from its central position by dog operation of valve plunger 263a, Fig. 40, in initiating a forward movement of cross slide 53, as just described, the plunger 286a will immediately be shifted to its left-hand position by reason of the then right-hand position of the valve plunger 295, Fig. 40, such left position starting the forward movement of slide 53 at quick traverse rate in the direction determined by the position of the dog operable valve plunger 261a, Figs. 37, 48. At any preferred point in the forward slide movement as determined by the configuration 328c or 328d of the feed pump adjusting cam 328, Fig. 17, the cross slide feed pump 215, Figs. 1, 48, will be adjusted for preferred feed rate, and at about the same time a dog such as 335a on the dog drum 335, Fig. 14, will shift the valve plunger 295, Figs. 40, 48, to its left-hand position whereby valve plunger 286a, Fig. 40, starts movement to the right. But when the valve plunger 286a arrives at central or feed position it is retained there by the detent plunger 291, Fig. 38, whereby the quick traverse fluid is cut off and the slide 53 continues to move solely from the feed pump fluid.

During such feed movement the plunger 295a, Fig. 40, has been dog shifted to the left, whereby to urge the valve plunger 286a to its right-hand position, which is prevented at the time by the engagement of the detent plunger 291, Fig. 38, but when the desired forward feed movement has been effected a dog such as 355a which is angularly adjustable on a dog drum 355, Figs. 1, 14, fixed on the cross slide actuating shaft 113, depresses a spring pressed valve plunger 356a of a valve unit 356, Figs. 14, 48, whereby to admit pressure fluid from the pressure line 266, Fig. 48, through a line 357, an annular groove in the valve plunger and through a line 358, Figs. 39, 48, which in the normal valve plunger position is connected to a drain, the pressure fluid passing to the floating valve 345 and shifting the valve plunger 345a to the right in Fig. 39, whereby to admit the pressure fluid to the channels 346, 347, 348, Figs. 38, 39, to shift plunger 349 to the left in Fig. 38 to release the detent plunger 291. The valve plunger 286a, Fig. 40, then moves to the right-hand position to which it is then urged, as stated, by reason of the left-hand position of valve plunger 295a, and the cross slide 53 immediately starts its return movement at quick traverse rate, and during such return movement a dog such as 335a, Figs. 1, 14, shifts the valve plunger 295a again to the right whereby, at the end of the return movement when the cross slide 53 is again in central position, the valve plunger 286a has been shifted to its central position and is retained there by the detent plunger 291, the parts then all being in position to start a new cycle of forward and return movement in either direction from the cross slide central position, as before.

It will be noted that a channel 360, Figs. 39, 40, 48, connects the forward pressure chamber 311 with the chamber 304 leading to the outlet through back pressure valve 306. This channel provides a manually adjustable valve of any suitable type, such as a needle valve 361. Valve 361 is normally closed, but may be manually opened to stop the cross slide forward movement at any time. Also the hand lever 290, Fig. 38, may be manually operated at any time to effect a forward and return movement of the cross slide independently of the automatic control previously described.

The return movement of the cross slide 53 during a forward and return cycle might also be effected by a dog operation of the valve plunger 263a, instead of by operation of valve unit 356, but only where an index movement of the turret and dog drum 200 is available for shifting the plunger 263a and the start of the return movement. This is sometimes desirable as, for example, when the forward cutting effected by a cross slide tool requires more time than the cutting time for a single station on the turret. In such case the switch 237, Fig. 49, which normally prevents indexing when the cross slide has been moved from central position, must be rendered ineffective by any suitable means, not shown.

The positive stops 118d or 118e, Fig. 15, previously described, may be used to determine the limit of forward movement of the cross slide, particularly if the start of the cross slide return movement is controlled from valve 263 as just mentioned. In such case the slide at the end of its forward movement may remain in fixed cutting position as determined by the adjustment of the stops until the subsequent index of dog drum 200 operates the valve plunger 263a to start the return.

The dog operable valve 264, Figs. 27, 48, operates in combination with a valve unit 285—1, Figs. 1, 48, for control of the forward and return movements of the turret carriage 54. The control valve unit 285—1, Fig. 48, is of identical construction and operation with that of the control valve unit 285, previously described. The corresponding valve parts have, therefore, been indicated by corresponding reference numerals, Fig. 48, and the same sectional views, Figs. 38, 39, 40, together with the previous explanation relating thereto may be referred to. Valve unit 285—*l* will therefore not be described further than is necessary for understanding of its connection and operation relative to other parts. The valve unit 285—*l* is continuously supplied with quick-traverse pressure fluid from the pump 210, Figs. 1, 48, through a primary relief valve 303—*l*, there being a secondary or back-pressure relief 306—*l* and an outlet drain 307—*l*, the pressure fluid being directed to a valve 286—*l* having forward, return and central or feed positions determined by the positions of a dog controlled valve 295—*l* and by the operation of a detent plunger 291—*l* controlled by a plunger 311—*l*, whereby quick traverse fluid may alternatively be passed to a forward line 277—*l* leading to the port 120a, Figs. 22, 48, of the turret carriage piston device 120, or to a return line 276—*l* leading to the piston port 120c, there being a line 322—*l* connecting the turret carriage feed pump 214 for effecting forward feed movements of the carriage when valve 286—*l* is in its central position. The line 322—*l* provides a manually adjustable valve, not shown, which is normally closed but may be opened to stop the forward movement of carriage 54 at any point. The forward movement of the turret carriage is initiated by oil pressure controlled by the dog operated valve 264, Fig. 48, operating through a channel 264b to shift a floating valve 345—*l* whereby to release the detent plunger 291—*l*, the detent being again released to effect the start of the return movement of the turret carriage by fluid supplied to the floating valve 345—*l* through a dog controlled valve 356—*l*. Similarly to unit 285 the unit 285—*l* may be manually controlled for forward and return movement by the hand lever 290—*l*.

Similarly to the control of the cross slide from valve unit 285 there is provided various supplemental control mechanism for the control of the turret carriage movement from valve unit 285—*l*. The control drum 190, Figs. 1, 33, travels with the turret carriage and is indexible with the turret 55 as has been previously explained, and at each index movement presents dog or cam sets for the operation of plungers 370, 371, 372, 373, during the forward movement of the carriage, the cams or dogs such as 374, Figs. 33, 34, being adjustably fixed, by any suitable means, in slots such as 190a. A pivoted lever 375, Figs. 33, 35, may also be dog operated in each index position of drum 190 by dogs, such as dog 376, Fig. 33, suitably fixed on the drum.

The plungers, Fig. 33, are carried in a bracket 377, which, together with another bracket 378, Fig. 32, slidably supports control bars or rods 379, 380, 381, 382, 383, Figs. 32, 33.

Referring to Fig. 34, the operating connection of the plungers 370, 371, 372, 373 to the shiftable bars is similar, but not identical, for each plunger, the plungers providing a slot such as 384 engaging one arm of a pivoted bell crank such as 385, the other arm of the crank engaging a slot such as 386 in the corresponding bar. Following a dog operated downward shift of the plunger, whereby the corresponding bar is shifted to the left, Fig. 34, the bar and plunger are returned by means which differs for the different plungers, as will be described.

The plunger 370, Fig. 33, is dog shifted downwardly during the forward movement of the turret carriage, such downward movement shifting the bar 379 to the left, Fig. 32, whereby to shift the valve 295—*l*, Fig. 48, of the valve unit 285—*l* in the one direction of its required movement. The shifting is effected through a pivoted lever 390, Fig. 1, one end of which engages a suitable slot in the bar and the other end connecting through a pivoted link 391 with a lever 336—*l* of valve unit 285—*l*, the lever 336—*l* corresponding to lever 336 of valve unit 285 and being correspondingly connected to the valve plunger. The bar 379 is extended to the right, Figs 27, 32, and there pivoted to a lever 392 which has tooth and notch engagement with another pivoted lever 393. During the return movement of turret carriage an adjustable stop 394, Figs. 1, 27, on the turret carriage strikes the lever 393 to effect the other direction of movement of the bar 379 and the connected plunger of the valve 295—*l*.

The plunger 371, Fig. 33, is dog shifted downwardly during the forward movement of the turret carriage, such downward movement shifting the bar 380 to the left, Fig. 32. The spindle drive motor has two speeds, as has previously been mentioned, whereby to increase the range of the available spindle speeds. The left-hand movement of the bar 380 is utilized to shift a lever 396a, Fig. 1, of a motor control switch 396, against the resistance of a spring, not shown, whereby to change the speed of the spindle driving motor, there being a dog 380a adjustably fixed on the bar 380 for shifting the motor switch lever. The motor speed control device, not shown, and the control switch 396 may be of any suitable well known type. The bar 380 is normally urged to the right, Fig. 32, by a spring such as spring 397, Fig. 34, to permit the motor switch lever to occupy its other speed position, and for this reason and in order to maintain the speed position of the switch effected by the downward movement of the plunger 371, Fig. 33, the plunger actuating dog is, in this instance, elongated in the direction of travel of dog drum 190 to hold the plunger down during the time the change of motor speed is required to operate.

The plunger 372, Fig. 33, is dog shifted either downwardly or upwardly in either direction of movement of the turret carriage to effect a desired adjustment of the spindle speed adjusting piston device 90, Figs. 7, 48. Plunger 372 is connected for movement with another plunger such as 372a, Figs. 33, 34, by the means of a pivoted lever such as 372b whereby downward movement of the one plunger forces the other plunger upwardly. The plungers are relatively offset, as shown in Fig. 33, in such manner that correspondingly offset cam dogs may operate on either plunger, whereby to shift the connected bar 381 in either direction to right or left in Fig. 32, the amount of such shifting being determined by the height of the cam dog. The bar 380 is connected by the means of a pivoted lever 380a, Figs. 1, 36, 45, to correspondingly shift a valve plunger 400a of a pressure adjusting valve device 400, Figs. 1, 44, 48, which is connected for adjustment of a valve unit 401, Figs. 6, 48, associated with the speed control piston 90a. Pressure fluid is continuously supplied to the piston device 90 through a line 402 which, in this instance, receives fluid from the back pressure channel 305, Figs. 39, 48, of the valve unit 285. Such fluid may pass to either of the piston ports 90c or 90d, Figs. 7, 48, through a valve device 403 having a floating plunger 403a which may move in either direction to close the passage to one or the other port.

The piston device 90 has spaced outlet ports 90e, 90f, 90g, 90h, Figs. 6, 48, and the piston 90a may move to cover any of these ports one at a time to prevent fluid outlet through the covered port, the ports being so spaced that the several port-covering positions respectively correspond to the different speed positions of the piston. A plunger 401a, Figs. 6, 48, of valve unit 401 provides an annular groove 401b, the plunger being normally urged to the left by a spring 401c but shiftable to various positions respectively where the groove 401b provides a drain passage for the different piston ports, and when any port is thus drained one or the other of the ports 90c or 90d will temporarily be open to the drain. The floating plunger 403a will then move in a direction to prevent drain of fluid through that port, and the pressure fluid through the other port will force the piston 90a to the position covering whichever port 90e, 90f, 90g or 90h has been drained by the positioning of the plunger 401a.

The position of plunger 400a of pressure control device 400, Figs. 44, 48, as determined by the dog-cam shifting of the bar 381, Fig. 33, controls the position of the plunger 401. The device 400 is continuously supplied with pressure fluid from the line 266, Fig. 48, through line 266a and a line 405, the fluid passing to an annular groove 400b, Figs. 44, 48. A two diametered piston or plunger 400c will normally be forced upwardly, Fig. 44, by the fluid pressure in the groove 400b until the fluid outlet to a chamber 400d is closed. Downward pressure on piston 400c prevents the closing until a certain pressure, determined by the downward pressure, exists in chamber 400d. The fluid in chamber 400d is connected by a channel 400e to operate plunger 401a of the valve unit 401, and as plunger 400a is moved by the shifting of the bar 381 the resulting variation of pressure exerted on plunger 400c through a spring 400f effects the required variations in fluid pressure in chamber 400d and on plunger 401a to cause the plunger to take up the various positions effecting the different speed positions of piston 90a.

The dogs on dog drum 190 for the shifting of the plungers 372, 372a, Fig. 33, whereby to effect the spindle speed control as described are elongated to maintain the position of plunger 400c during the time when the desired speed is to operate, and are of various heights according to the speed required.

The dog operable plunger 373, Fig. 33, shifts the bar 382 to the left in Fig. 32, the bar being subsequently returned to the right by a spring such as spring 397, Fig. 34. The bar is connected for the left-hand movement to adjust the turret carriage feed pump 214, Figs. 1, 48, to a desired feed rate position determined by the height of the bar shifting dog, there being a pivoted lever 410, Fig. 36, having an arm 410a engaging a slot in the left end of the bar 382 and providing a gear segment portion engaging another lever 410b to which is attached the adjusting cable 214a, Figs. 1, 36, of the feed pump. The dogs on drum 190 for effecting the feed pump adjustment, as described, are of suitable height for determining the required feed rate, as stated, and of sufficient length to maintain the adjustment during the required feed rate period of the turret carriage forward movement.

The dog operable lever 375, Figs. 33, 35 is shifted by a dog such as 376, as has been stated. The lever is pivoted at 375a and extends downwardly for the lower end to engage a suitable actuating notch in the bar 383, whereby the dog shifts the bar to the right in Figs. 32, 35. At its left end the bar is notched to engage an arm 411a, Fig. 36, of a pivoted lever 411, having another arm 411b which in the right-hand movement of the bar depresses the valve plunger of the valve device 356—l, Figs. 36, 48, whereby to admit pressure fluid from the back pressure channel 305—l of the valve unit 285—l through a channel 357—l, and through the annular groove of the valve plunger to a normally drained line 358—l which connects to the floating valve 345—l of valve unit 285—l. This starts the return movement of the piston device 120 and of turret carriage 54 in a manner which will be understood from previous description of the corresponding valve unit 356 and floating valve 345 for effecting return movement of the cross slide 53. A spring 375b, Fig. 35, is provided to return the bar 383 to its left-hand position whereby to release the valve unit 356—l for subsequent operation of floating valve 345—l to effect the start of the next forward carriage movement. If for any reason the described trip for starting carriage return movement fails to operate the dog 376 will abut a bracket portion 311a, Figs. 35, 36, whereby to prevent further forward movement of the turret carriage.

It will be noted that the pressure line 266 which supplies pressure fluid for various control devices, as has been mentioned, also receives its fluid supply from the back pressure channel 305—l of the valve unit 285—l.

The turret carriage forward movement is initiated by the operation of the plunger 264a of valve 264, Figs. 37, 48, from a dog on the indexible drum 200, as has been stated. The valve 264 operates somewhat differently than the various other valves, previously described, which are dog operated from the drum 200. Referring to Figs. 31, 48, the valve receives pressure fluid from line 266 through a port 266p, and at a time determined by the indexing of a suitable dog on drum 200 connects the pressure fluid through a line 264b, which is normally vented through a drain such as 264c, and operates the floating valve 345—l of the valve unit 285—l whereby to start forward movement of the turret carriage 54 in a manner which will be understood from the previously described similar operation of the corresponding floating valve 345 of valve unit 285 in the starting of the forward movement of the cross slide 53.

In this instance, however, it is necessary that the starting of the carriage forward movement shall not take place until the index movement of turret 55 together with dog drum 200 has been completed. For this reason the admission of pressure fluid to the line 264b is delayed until the actuating dog has passed over the valve plunger 264a and the valve parts have effected a certain amount of upward movement during return to initial position, as follows:

The plunger 264a, Fig. 31, has its lower portion slidably fitted in an axial bore of another plunger 264d which is normally forced upwardly by pressure fluid from the line 266 operating on a lower plunger 264dd, the fluid passing through a valve device 415, Figs. 28b, 48, to enter a lower valve chamber 264e, there being an outlet from chamber 264e through a spring loaded ball valve 264f. The plunger 264a is normally forced upwardly, relative to plunger 264d, by a spring 264g, but is limited in its relative movement by an abutment pin 264h. The valve device 415, Figs. 28a, 48, includes a plunger 415a spring pressed toward a position where the pressure fluid channel is open to the chamber 264e of valve 264, Fig. 31, but the return of turret carriage 54 to its right-hand position forces the plunger to the right, Fig. 28a, sufficiently to close the passage leading to the chamber, the valve 415 remaining in such position during the indexing and during the dog operation of plunger 264a which starts the next forward carriage movement. When valve plunger 264a is depressed by the dog on drum 200 the fluid trapped in chamber 258 can escape only through the loaded valve 264f and the first effect of the dog is to move the plunger 264a downwardly while plunger 264d remains stationary thereby interrupting communication, through an annular groove 264i of plunger 264a, between annular grooves 264j and 264k. Continued downward movement causes these grooves 264j and 264k to respectively communicate with the inlet port 266p and the outlet channel 264b but fluid cannot then pass to the outlet channel since there is still no communication between the grooves. However, shortly after the completion of the indexing has moved the operating dog past the plunger 264a the spring 264g moves the plunger 264a upwardly relative to the plunger 264d sufficiently for the annular groove 264i to again effect communication between grooves 264j and 264k and the pressure fluid then passes to line 264b to start the forward movement of the carriage 54 as described. As soon as the carriage moves forward pressure fluid is again admitted through valve 415 to move the various parts of valve 264 to initial position and to connect the line 264b to the drain, as before.

An illustrative cycle of machine operation will now be described:

As has been stated the tool equipment of the machine may include cross slide tool sets both at the right and left ends, Fig. 10, of the cross slide 53, respectively for operating on the work during forward movement of the cross slide to the left and to the right of the central position shown in Fig. 10. A cycle of machine operation therefore may include a forward movement of the cross slide 55 in either direction from the central position shown in Fig. 10, followed by a return to the central position, and a subsequent similar forward and return movement in the other direction, the return movement in each instance bringing the cross slide back to the position of Fig. 10. These cross slide movements are effected while the cross slide carriage 52 is in its working position adjustably determined by the positioning of the notch 106 of the block 107, Fig. 11, the cross slide carriage being automatically moved to the working position, preferably before the starting of a forward cross slide movement, and subsequently, before the end of the machine cycle, being moved to the right, Fig. 1, to what may be termed a loading position, which permits access for removing and replacing a work piece carried on spindle 51. Therefore at the start of a machine cycle the cross slide is in its central position and its carriage is in loading position, at the right in Fig. 1.

The tool equipment also, ordinarily, includes various turret tool sets which are associated with the different lateral flat sides of the turret 55, Fig. 18, to be operative during the forward movement of the turret carriage 54 respectively when the different turret faces are indexed to stand in the direction of the main spindle, that is to say, at the left in Fig. 18.

A cycle of machine operation includes the step-by-step indexing of the turret 55 through one revolution, whereby the dog drums 190 and 200 are each also indexed through one revolution, but if the nature of the work piece does not require as many turret tool sets as there are tool faces provided on the turret some of the index movements of the turret and dog drums may cause these parts to pass over some of the index positions in the manner previously explained. The indexing is effected while the turret carriage 54 is on its extreme right position, shown in Fig. 1, and between each successive operation of the turret index mechanism the carriage is caused to effect a forward movement, to the left of the position shown in Fig. 1 and a return to the position of Fig. 1.

At the conclusion of a cycle of machine movement the main clutch 61 has been interrupted whereby spindle 51 is stationary for unloading the work piece, the feed pumps 214, 215 which are driven from the spindle also being stationary; also the cross slide 53 has been returned to the central position shown in Fig. 10 and the cross slide carriage 52 has been moved to the right to loading position; also the turret carriage 54 has been returned to loading position at the extreme right in Fig. 1 and following such return the turret 55 has been indexed to bring into operating position the first set of turret tools which will be used in the next machine cycle; also both the feed pumps 214, 215 are in the zero delivery position of adjustment. The last indexing of the turret has also indexed dog drum 190 for bringing into operative position the dog set thereon required for controlling the next forward movement of the turret carriage, but by reason of the lost motion connection in the coupling members 203, 204a, Fig. 27, the first dog set on the dog drum 200 has not moved into operative position. The main spindle motor and the motor driving the pumps 210, 211 continue to run, unless interrupted by manual means, not shown.

It will also be noted that the control valve units 285 and 285—l, Fig. 48, respectively for control of the cross slide and of the turret carriage forward and return movements are, at the end of a machine cycle, each in the adjustment when left by the last previous return movement of the supports which they control. That is to say, the detent plungers 290 and 290—l are retaining each of the valve members 286 and 286—l in central position, which now effects interruption of the support movement controlled thereby since the feed pumps are not operating, but the valves 295 and 295—l of the respective units are each in the position where the valves 286 and 286—l are being urged to the support-forward position.

Also, the last previous return movement of the turret carriage 54 has, prior to the last index movement, shifted the plunger 148, Figs. 19, 20, to withdraw the primary index plunger 126 and to condition the secondary index plunger 128a to enter its locating bushing during the indexing, where it is now positioned for determining the turret position until the main index plunger is engaged by the movement of plunger 148 in reverse direction during the next forward movement of the turret carriage. The shifting of plunger 148 also unclamped the turret clamp ring 125a, 125b, which will again be clamped at the beginning of the next forward carriage movement.

A new machine cycle may then be started by manual movement of the lever 250, Figs. 1, 27, to angularly move the dog drum 200 to render the first set of drum dogs thereon effective on the control plungers 260a, 261a, etc. A dog depressing the valve plunger 264a effects release of the detent plunger 290—l, whereby valve 286—l is immediately shifted to the position effecting the forward movement of the turret carriage at quick traverse rate. Another dog depressing the plunger 260a disengages the spindle brake 100 and engages the main clutch 61, whereby to start rotation of the spindle 51 and feed pumps 214, 215, this dog ordinarily being of a form to continue the spindle rotation throughout the machine cycle. Another dog operates the plunger 262a to effect movement of the cross slide carriage 52 to the left whereby to position the cross slide 53 in working position, this dog ordinarily being of such form as to maintain the cross slide in working position until the conclusion of such forward and return movements are required of the cross slide. Another dog operates the plunger 261a whereby to condition the valve unit 275, Fig. 48, to determine whether the first forward movement of cross slide 53 will be to the right or left of the central position shown in Fig. 10. The plunger 263a may also be dog operated at this time, whereby to operate the control valve unit 285, Fig. 48, to start the first forward and return movement of the cross slide in the direction determined by the dog operation of valve plunger 261a, but such first forward and return of the cross slide may be deferred until a later indexing of the dog drum 200, as later described, whereby to insure that the cross slide carriage 52 has reached its working position at the time when the cross slide tools start operation on the work piece.

At the start of the turret carriage movement, initiated as described, the spring 149, Fig. 20, forces the plunger 148 to the right, relative to the carriage, whereby the main index plunger 126, Figs. 19, 20, is engaged to locate the turret, the secondary index plunger 128a is withdrawn and conditioned for operation at the next index movement, and the turret clamp ring 125a, 125b is again clamped.

During the forward movement of the turret carriage, the first dog set on the dog drum 190 operates to shift the various control plungers 370, 371, etc., Fig. 33. The plunger 371 may be dog operated to change the speed of the spindle drive motor and plunger 372 dog operated to change the driving ratio of the spindle gear train, whereby to adapt the spindle speed to the particular turret tools operating during this forward turret movement. At suitable time during the forward movement the plunger 373 is dog operated to adjust the feed pump 214 to effect the feed rate required for the particular turret tools, and just shortly thereafter the plunger 370 is dog operated whereby to shift valve 295—l of valve unit 285—l to the position where valve 286—l is urged toward its reverse position, the valve 286—l however being retained by the detent plunger 291—l when it reaches the central position where the feed pump will be effective for continuing the forward movement of the carriage at the feed rate determined by plunger 373. At the end of the forward feed movement thus effected the lever 375 is operated whereby to trip the detent 291—l of the valve unit 285—l and the valve 286—l immediately shifts to the reverse position returning the turret and turret carriage at quick traverse rate to the extreme right position, Fig. 1. As the turret carriage reaches such extreme right position the abutment 394, Fig. 27, reversely shifts the control bar 379 and the plunger 370, whereby to shift valve 295—l of unit 285—l to a position where valve 286—l is urged toward forward position, the valve 286—l, however, being retained by the detent 290—l when it reaches central position, which now effects a stop since the feed pump 214 has meanwhile been returned to zero delivery adjustment by the return of the dog which operated the plunger 373.

During such carriage return movement the plunger 148 operates, as previously mentioned, to withdraw the index locating plungers and unclamp the turret, and at the end of return movement the turret and the dog drums 190, 200 are indexed, whereby to start another forward and return turret carriage movement as before, the turret index movement being started by the closing of switch 225, Figs. 27, 49, controlling the index motor 131, and the indexing continuing as determined by the dogs 232a, Figs. 27, 39, until both the switch 225 and another switch 226, Figs. 26, 49, are simultaneously interrupted.

The index movement thus effected indexes drum 200 to start a new forward and return movement of the turret carriage which will now be controlled as to feed rate and extent of forward movement by the second set of dogs on drum 190. It will be apparent from the preceding description that as many forward and return movements of the turret carriage may be effected during a machine cycle as are required for a particular work piece up to the number corresponding to the tool faces provided on the turret, each forward movement being individually controlled as to the feed rate and extent thereof, and also as to the spindle speed which is operative during the forward movement.

During some of the index movements of the machine cycle the first forward movement of the cross slide 53 is effected. The direction of the forward movement from the central position shown in Fig. 10 is determined by the dog operation of valve plunger 261a, Figs. 27, 48, and the forward movement is initiated by dog operation of the valve plunger 263a, as stated, which releases the detent 291 of valve unit 285, Fig. 48, and the valve 286 immediately shifts to the position effecting the forward movement at quick traverse rate. At suitable time during the forward movement the cross slide feed pump 215, Figs. 1, 48, is adjusted by the cam portion 328c or 328d, Fig. 17, to effect the feed rate required for the particular forward movement and just shortly thereafter a dog on the drum 335, Figs. 1, 14, shifts valve 295 of valve unit 285 to the position where valve 286 is urged toward its reverse position, the valve 286, however, being retained by the detent plunger 291 at central position where the feed pump will be effective for continuing the forward movement of the cross slide at the feed rate determined by the feed pump adjustment. At the end of the forward movement a dog on the drum 355, Fig. 1, operates the valve 356, Figs. 1, 48, whereby to trip the detent 291 and the valve 286 immediately shifts to the position returning the cross slide at quick traverse rate to its central position shown in Fig. 10. At this time another dog on the drum 335 reversely shifts the valve 295 whereby to urge valve 286 again to its forward position, but the valve 286 moves only to its central position, where it is retained by the detent 291 until again released for another forward cross slide movement as before, the central valve position now interrupting the slide movement since the pump adjusting cam has returned the feed pump to zero delivery adjustment.

If the machine cycle requires a second forward movement of the cross slide 53 in the other direction from the central position of Fig. 10 the valve plungers 261a and 263a, respectively for determining the direction and for initiating the forward movement, may both be dog operated at any subsequent index movement of the dog drum 200, the resulting forward and reverse movement of the cross slide being controlled as before. Following the last cross slide movement required for a machine cycle, the cross slide then being in its central position, the cross slide carriage 52 may, at the next or any later indexing of the drum 200, be returned to the loading position to the right in Fig. 1, by the dog operation of the valve plunger 262a.

It will be apparent that, in each direction of the forward and return movement of the cross slide, the forward movement may be individually controlled as to the extent and feed rate thereof.

The last index movement of the turret 55 during a cycle of machine movement as described positions the turret and the dog drum 190 in the position required for the first forward movement of the next machine cycle, as has been stated, but the drum 200 is so positioned, by reason of the lost motion in the index coupling of this drum, that the first set of dogs on this drum will not be effective until the hand lever 250 is manually shifted for initiating a new cycle, as before.

What is claimed is:

1. In a lathe, the combination of a rotatably indexible turret, a cross slide guided for forward and return movement, power operable transmission mechanism for said forward and return movement, control means for said transmission mechanism for initiating said forward and return movement in accordance with the index movement of said turret, and other control means for said transmission including dog controlled means operative in accordance with said forward movement.

2. In a lathe, the combination of a bed, a work spindle rotatably supported therefrom, a carriage supported from said bed for reciprocatory movements, a turret supported from said carriage for bodily reciprocation therewith and for rotary index movement, carrier means connected for index movement in accordance with the indexing of said turret and for reciprocatory movement in accordance with the movement of said carriage, power operable transmission mechanism for rotation of said spindle including an adjustable spindle rate changer, and control means for adjusting said spindle rate changer including a plurality of adjusting elements on said carrier means and respectively for effecting said adjustment in different index positions of the carrier means and in different reciprocatory movements thereof.

3. In a lathe, the combination of a bed, a work spindle rotatably supported therefrom, a carriage supported from said bed for reciprocatory movements, a turret supported from said carriage for bodily reciprocation therewith and for rotary index movement, carrier means connected for index movement in accordance with the indexing of said turret and for reciprocatory movement in accordance with the movement of said carriage, power operable transmission mechanism for rotation of said spindle including an adjustable spindle rate changer, power operable transmission mechanism for said reciprocatory movement including an adjustable feed rate changer, control means for adjusting said spindle rate changer including a plurality of adjusting elements on said carrier means respectively for effecting the adjustment in different index positions of the carrier means and in different reciprocatory movements thereof, and control means for adjusting said feed rate changer including another plurality of adjusting elements on said carrier means respectively operative in different index positions of the carrier means and in different reciprocatory movements thereof.

4. In a lathe, the combination of a bed, a carriage supported from said bed for reciprocatory forward and return movement, a turret supported from said carriage for bodily reciprocation therewith and for rotary index movement, carrier means connected for index movement in accordance with the indexing of said turret and for reciprocatory movement in accordance with the movement of said carriage, power operable transmission mechanism for said reciprocatory movements including means shiftable for effecting a change from a forward rate to a relatively slow forward feed rate, and control means for shifting said shiftable means including a plurality of shifter elements on said carrier means respectively for operation in the different index positions of the carrier means and in different reciprocatory movements thereof.

5. In a lathe, the combination of a bed, a carriage supported from said bed for recpirocatory forward and return movement, a turret supported from said carriage for bodily reciprocation therewith and for rotary index movement, carrier means connected for index movement in accordance with the indexing of said turret and for reciprocatory movement in accordance with the movement of said carriage, power operable transmission mechanism for said reciprocatory movements including means shiftable for effecting a change from a forward rate to a relatively slow forward feed rate and a feed rate changer adjustable for determining said feed rate, control means for shifting said shiftable means including a plurality of shifter elements on said carrier means respectively for operation in different index positions of the carrier means and in different reciprocatory movements thereof, and control means for adjusting of said feed rate changer including a plurality of adjusting elements on said carrier means respectively operative in the different index positions of the carrier means and in different reciprocatory movements thereof.

6. In a lathe, the combination of a bed, a spindle rotatably supported therefrom, a cross slide supported from said bed for forward movement in either of opposite directions in a path transverse to the axis of said spindle and return movement from either direction of said forward movement to a starting position in said path, power operable transmission mechanism for said cross slide movements, and control mechanism for said transmission including a plurality of control members respectively operative in accordance with the movement in different of said directions for interrupting the corresponding forward movement and substantially simultaneously initiating the corresponding return movement.

7. In a lathe, the combination of a bed, a spindle rotatably supported therefrom, a cross slide supported from said bed for forward movement in either of opposite directions in a path transverse to the axis of said spindle and return movement from either direction of said forward movement to a starting position in said path, power operable transmission mechanism for said cross slide movements including an adjustable feed rate changer, and control mechanism for adjustment of said feed rate changer including a plurality of adjusting members respectively operative in accordance with the movement in different of said directions.

8. In a lathe, the combination of a bed, a spindle rotatably supported therefrom, a cross slide supported from said bed for forward movement in either of opposite directions in a path transverse to the axis of said spindle and return movement from either direction of said forward movement to a starting position in said path, power operable transmission mechanism for said cross slide movements including means shiftable for effecting a change from a forward rate to a relatively slow forward feed rate in either of said directions of movement, and control means for shifting said shiftable means including a plurality of shifter members respectively operative in accordance with the movement in different of said directions.

9. In a lathe, the combination of a bed, a spindle rotatably supported therefrom, a cross slide supported from said bed for forward movement in either of opposite directions in a path transverse to the axis of said spindle and return movement from either direction of said forward movement to a starting position in said path, power operable transmission mechanism for said cross slide movements including means shiftable for effecting a change from a forward rate to a relatively slow forward feed rate in either of said directions of movement and an adjustable feed rate changer, and control means for said transmission mechanism including a plurality of control members respectively operative for shifting said shiftable means and for adjusting said feed rate changer during one of said directions of forward movement, and another plurality of control members respectively operable for shifting said shiftable means and adjusting said feed rate changer in the other direction of said forward movement.

10. In a lathe, the combination of a bed, a carriage supported from said bed for reciprocatory movement including a forward movement from a loading position and a return movement to said loading position, a turret, supported from said carriage for reciprocatory movement therewith and for rotary index movement, a power operable transmission mechanism for said reciprocatory carriage movement, a power operable transmission mechanism for said rotary index movement, control means for effecting repeated cycles of alternate reciprocatory and index movement including a control device operable from said reciprocatory carriage movement for effecting a power connection of said indexing transmission mechanism as said carriage reaches said loading position and a control device operable in accordance with the resulting indexing movement for effecting a power connection of said reciprocatory carriage transmission mechanism, means interrupting both said transmissions following a predetermined number of index movements, and manually operable means for subsequently connecting one of said transmissions for initiating another series of said repeated cycles of movement.

11. In a lathe, the combination of a bed, a carriage supported from said bed for reciprocatory movement including a forward movement from a loading position and a return movement to said loading position, a turret supported from said carriage for reciprocatory movement therewith and for rotary index movement, power operable transmission mechanism for said reciprocatory carriage movement, power operable transmission mechanism for said rotary index movement, control means for effecting repeated cycles of alternate reciprocatory and index movement including a control device operable from said reciprocatory carriage movement for effecting a power connection of said indexing transmission mechanism as said carriage reaches said loading position and a control device operable in accordance with the resulting indexing movement for effecting a power connection of said reciprocatory carriage transmission mechanism, and other control means for individually altering different of said cycles including a plurality of transmission control members each indexible into operative position in accordance with said index movement.

12. In a lathe, the combination of a bed, a tool spindle rotatably supported from said bed, a carriage supported from said bed for reciprocatory movement including a forward movement from a loading position and a return movement to said loading position, a turret supported from said carriage for bodily movement therewith and for rotary index movement, a transmission for rotation of said spindle including means shiftable for alternatively interrupting or establishing rotation thereof, a power operable transmission for said reciprocatory carriage movement, a power operable transmission for said rotary index movement, control means operable for effecting repeated cycles of alternate reciprocatory and index movement including a control device operable for effecting a power connection of said index transmission as said carriage reaches said loading position and a control device operable from the resulting index movement for effecting a power connection of said carriage transmission, means interrupting both said index transmission and said carriage transmission following a predetermined number of index movements, manually operable means for subsequently engaging one of the last mentioned transmissions for initiating another series of said repeated cycles of movement, and control means operable from one of said last mentioned transmissions at a predetermined point in said cyclic movements for shifting said shiftable means.

13. In a machine tool, the combination of a rate changer adjustable to various adjustment positions respectively for different rate effects, means for adjusting said rate changer including a member shiftable to high rate, low rate and a plurality of intermediate positions respectively in accordance with different pressures applied to said member, and rate selector means including a pressure changing device selectively adjustable to apply to said member said different pressures respectively effecting said different member positions.

14. In a machine tool, the combination of a rate changer adjustable to various adjustment positions respectively for different rate effects, adjusting means for said rate changer including a fluid operable plunger shiftable to various positions including high rate, low rate and a plurality of intermediate rate positions respectively in accordance with different fluid pressures applied thereto, and speed selector means including valve means selectively adjustable for alternative selection of different of said fluid pressures.

15. In a machine tool the combination of a mechanical rate changer adjustable to various adjustment positions collectively effecting high, low and intermediate rates, a shifter device for adjusting said rate changer including a fluid operable piston device and a fluid operable plunger controlling fluid delivery to said piston device in accordance with variations in fluid pressure applied to said plunger, and rate selector means including valve means adjustably determining various fluid pressures on said plunger respectively corresponding to different of said rates.

16. In a machine tool having a rotatable spindle and a relatively bodily movable support, the combination of a transmission for rotation of said spindle including a rate changer adjustable to various adjustment positions respectively for different spindle speeds, means for adjusting said rate changer including a member shiftable to various positions in accordance with variations in pressure applied thereto, different of said member positions respectively corresponding to different of said spindle speeds, speed selector means including a pressure changing device adjustable to apply to said member different pressures respectively effecting said different member positions, and means for connecting said device for adjustment from said relative support movement.

17. In a machine tool the combination of a first and a second support relatively movable in either of opposite directions to alternatively effect one or the other of different relative support positions, one of said supports carrying a locating plunger shiftable in a path transverse to said relative movement and the other support providing a configuration engageable by said plunger when the supports are in one of said positions, and means for said relative support movement including a member movable in different directions respectively for effecting the different support positions, said member being connected for urging said support movement through said plunger in a manner to shift said plunger prior to support movement and in different directions respectively in the different directions of member movement.

18. In a lathe the combination of a bed, a tool spindle rotatably supported from said bed, a tool carriage supported from said bed for movement between operating and loading positions in a path parallel with the axis of said spindle, a locating plunger carried by said carriage and shiftable in a path transverse to said carriage path, a block adjustable on said bed in the direction of carriage movement and providing a configuration engageable by said plunger in various positions of said block adjustment respectively corresponding to different operating positions of said carriage, a reversibly fluid operable actuator, and a train connecting said actuator for urging carriage movement through said plunger in a manner such that in the actuator direction urging movement from said operating position to said loading position the initial movement of said actuator will operate to withdraw said plunger from said engagement, and in the actuator direction urging movement from said loading position to said operating position the plunger will be continuously urged in the direction to engage said configuration.

19. In a transmission and control mechanism the combination of a reversibly fluid operable motor, a source of pressure fluid, a plurality of passages respectively for fluid supply to said motor for effecting different directions of motor actuation, valve means oppositely shiftable to different positions respectively connecting said pressure fluid source to different of said passages and shiftable to an intermediate position, means operable for urging said valve means from one of said passage connecting positions toward the other thereof, detent means operable during the valve means movement resulting from said urging means to stop and releasably retain the valve means in said intermediate position, and means for subsequently releasing said detent means whereby said urging means will continue the valve means movement to effect said other passage connecting position thereof.

20. In a transmission and control mechanism, the combination of a reversibly fluid operable motor, a plurality of passages respectively for fluid supply to said motor for effecting different directions of motor actuation, pressure fluid supply means including a quick traverse rate supply channel and a relatively slow feed rate supply channel, valve means oppositely shiftable to different positions respectively connecting said quick traverse rate channel to different of said motor passages and shiftable to an intermediate position interrupting said connection, a device shiftable in opposite directions respectively for urging said valve means from different of said passage connecting positions to the other thereof, detent means operable in either direction of shifting of said valve means to stop and releasably retain the valve means in said intermediate position, means for releasing said detent means whereby said urging device abruptly shifts said valve means in one direction to connect said quick traverse rate channel to one of said motor passages to effect a quick traverse rate in one direction of motor actuation, dog operable means subsequently actuated from said motor during the last mentioned direction of motor actuation for operating said urging means to urge said valve means in the other direction to be stopped in said intermediate position by said detent means, and means operatively connecting said feed rate channel with the last mentioned one of said motor passages at least during the last mentioned stopped position of said valve means whereby to effect a feed rate of motor actuation continuing said motor movement in said last mentioned direction.

21. In a transmission and control mechanism, the combination of a reversibly fluid operable motor, a plurality of passages respectively for fluid supply to said motor for effecting forward and reverse directions of motor actuation, pressure fluid supply means including a quick traverse rate supply channel and a relatively slow feed rate supply channel, valve means oppositely shiftable to different positions respectively connecting said quick traverse rate channel to different of said passages and shiftable to an intermediate position interrupting said connection, a device shiftable in opposite direction respectively for urging said valve means from different of said passage connecting positions to the other thereof, detent means operable in either direction of shifting of said valve means to stop and releasably retain the valve means in said intermediate position, means operatively connecting said feed rate channel to the forward direction of motor passage at least while said valve means is in the intermediate position resulting from a shifting of the valve means toward the position connecting said reverse passage to said quick traverse channel, and dog operable means for shifting said urging device and for releasing said detent device to control said valve means for effecting in the order recited a forward movement of said motor at quick traverse rate, a change to forward movement at feed rate, and an abrupt change to reverse movement at quick traverse rate.

22. In a transmission and control mechanism, the combination of a reversibly fluid operable motor, a plurality of passages respectively for fluid supply to said motor for effecting forward and reverse directions of motor actuation, pressure fluid supply means including a quick traverse rate supply channel and a relatively slow feed rate supply channel, valve means oppositely shiftable to different positions respectively connecting said quick traverse rate channel to different of said passages and shiftable to an intermediate position interrupting said connection, a device shiftable in opposite directions respectively for urging said valve means from different of said passage connecting positions to the other thereof, detent means operable in either direction of shifting of said valve means to stop and releasably retain the valve means in said intermediate position, means operatively connecting said feed rate channel to the forward direction of motor passage at least while said valve means is in the intermediate position resulting from a shifting of the valve means toward the position connecting said reverse passage to said quick traverse channel, means for interrupting motor actuation including means for shifting said urging device to urge said valve means toward the position connecting said quick traverse channel to said forward passage to be retained in central position by said detent means, and means for subsequently in the order recited releasing said detent means to continue the shifting of the valve means to connect said quick traverse channel to said forward motor passage, shifting said urging device to urge said valve means toward the position connecting said quick traverse channel with said reverse passage to be stopped in said intermediate position by said detent means whereby to effect a feed rate, and releasing said detent means to continue the shifting of said valve means to connect said quick traverse channel to said reverse passage.

23. In a machine tool the combination of a turret supported for rotary index movement, a cross slide supported for reciprocatory movement, power operable transmission mechanism for said rotary index movement including connector means shiftable to a position interrupting said transmission, and interlock means maintaining said interrupting position of said connector means except when said cross slide is in predetermined position in its reciprocatory movement.

24. In a machine tool the combination of a turret supported for rotary index movement and for bodily reciprocatory movement between loading and working positions, means for indexing said turret while in said loading position, and interlock means preventing movement of the turret from said loading position to said working position except when said turret is in one or another of predetermined index positions thereof.

25. In a machine tool the combination of a turret supported for rotary index movement and for bodily reciprocatory movement, means for effecting a cycle of machine operation including a series of alternate reciprocatory and index movements of said turret in which the reciprocatory movements are respectively effected with said turret in different index positions, and interlock means interrupting any reciprocatory movement in said series except when said turret is in the index position corresponding thereto.

26. In a lathe, the combination of a bed, a work spindle supported from said bed for rotary movement, a tool carriage supported from said bed for longitudinal movement parallel with the spindle axis, a tool slide supported from said tool carriage for cross movement transverse to the spindle axis, a turret carriage supported from said bed for longitudinal movement parallel with the spindle axis, a turret supported from said turret carriage for rotary index movements, power operable transmission mechanism for each of said movements, a carrier indexible in accordance with the index movements of said turret, and control means for said transmission mechanism including a plurality of sets of control members on said carrier, said sets being respectively operable in different index positions of the carrier, said control members being collectively operable to initiate said movements in an order and sequence determined by the members and including repeated cycles of some of said movements.

27. In a lathe, the combination of a bed, a work spindle supported from said bed for rotary movement, a tool carriage supported from said bed for longitudinal movement parallel with the spindle axis, a tool slide supported from said tool carriage for cross movement transverse to the spindle axis, a turret carriage supported from said bed for longitudinal movement parallel with the spindle axis, a turret supported from said turret carriage for rotary index movements, power operable transmission mechanism for each of said movements, a carrier indexible in accordance with the index movements of said turret, power operable transmission mechanism for each of said movements, and control means for said transmission mechanism for initiating said movements to effect a predetermined order and sequence thereof including repeated cycles of some of said movements, comprising a carrier indexible in accordance with the index movement of said turret, a plurality of shiftable pilot valves, and a plurality of sets of pilot valve shifter members on said carrier, said sets being respectively operable to determine the shifted position of said pilot valves in the different index positions of the carrier.

LOUIS EDWARD GODFRIAUX.

Certificate of Correction

Patent No. 2,289,957.  July 14, 1942.

LOUIS EDWARD GODFRIAUX

It is hereby certified that errors appear in the above numbered patent requiring correction as follows: Throughout the printed specification for the reference numerals "276—*l*", "277—*l*", "285—*l*", "286—*l*", "290—*l*", "291—*l*", "295—*l*", "303—*l*", "305—*l*", "306—*l*", "307—*l*", "311—*l*", "322—*l*", "336—*l*", "345—*l*", "356—*l*", "357—*l*" and "358—*l*" read *276—1; 277—1; 285—1; 286—1; 290—1; 291—1; 295—1; 303—1; 305—1; 306—1; 307—1; 311—1; 322—1; 336—1; 345—1; 356—1; 357—1* and *358-1* respectively; page 2, second column, line 2, for "togglemembers" read *toggle members*; line 18, for "spool 6" read *spool 86*; line 29, before "means" insert *the*; page 4, second column, line 71, for "movement and" read *movements of*; page 5, first column, line 32, for "switch 26" read *switch 226*; page 7, first column, line 13, for "mevement" read *movement*; page 10, first column, line 15, for "the positions" read *the position*; page 15, first column, line 61, claim 10, strike out the comma after "turret"; page 17, first column, line 3, claim 21, for "direction" read *directions*; and that the said Letters Patent should be read with these corrections therein that the same may conform to the record of the case in the Patent Office.

Signed and sealed this 6th day of October, A. D. 1942.

[SEAL]

HENRY VAN ARSDALE,
*Acting Commissioner of Patents.*